US009344406B2

(12) United States Patent
Isozaki et al.

(10) Patent No.: US 9,344,406 B2
(45) Date of Patent: May 17, 2016

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Hiroshi Isozaki, Kanagawa (JP); Ryuiti Koike, Kanagawa (JP); Jun Kanai, Tokyo (JP); Jun Ohashi, Tokyo (JP); Kentaro Takeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 13/946,366

(22) Filed: Jul. 19, 2013

(65) Prior Publication Data

US 2014/0025954 A1  Jan. 23, 2014

(30) Foreign Application Priority Data

Jul. 23, 2012  (JP) ................................ 2012-163021

(51) Int. Cl.
*H04L 29/06* (2006.01)

(52) U.S. Cl.
CPC ........ *H04L 63/0428* (2013.01); *H04L 63/0227* (2013.01); *H04L 63/123* (2013.01)

(58) Field of Classification Search
CPC ............ H04L 63/0428; H04L 63/0227; H04L 63/123; H04L 29/06
USPC ....................................................... 713/176
See application file for complete search history.

(56) References Cited

U.S. PATENT DOCUMENTS

| 8,826,005 | B1 * | 9/2014 | Brichford ...................... 713/156 |
| 2010/0037088 | A1 | 2/2010 | Krivopaltsev et al. |
| 2012/0311675 | A1 * | 12/2012 | Ham et al. ........................ 726/4 |
| 2013/0333039 | A1 * | 12/2013 | Kelly .............................. 726/24 |

OTHER PUBLICATIONS

Notice of Rejection issued by the Japanese Patent Office on Jun. 24, 2014, for Japanese Patent Application No. 2012-163021, and English-language translation thereof.

* cited by examiner

*Primary Examiner* — Chau Le
*Assistant Examiner* — Muhammad Chaudhry
(74) *Attorney, Agent, or Firm* — Finnegan, Henderson, Farabow, Garrett & Dunner LLP

(57) ABSTRACT

According to an embodiment, an information processing device includes an event processor and a first determining unit. The event processor includes an event detecting unit. The event detecting unit is configured to detect an event and suspend execution of the event. The first determining unit registering unit is configured to register the first determining unit when stored first identification information and identification information of the first determining unit match with each other. The first determining unit includes a second determining unit. The second determining unit registering unit is configured to register a second application as a second determining unit when the verification of a signature of the second application is successful. The event detecting unit cancels suspending of the event and executes the event when the result of determination indicates permission of the execution.

9 Claims, 17 Drawing Sheets

INFORMATION PROCESSING DEVICE, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2012-163021, filed on Jul. 23, 2012; the entire contents of which are incorporated herein by reference.

FIELD

Embodiments described herein relate generally to an information processing device, an information processing method, and a computer program product.

BACKGROUND

In the field of personal computers (PCs) in recent years, administrator privileges and general user privileges are separated by passwords and a general user of a device is given only a user privilege by setting a password for the general user privilege. In addition, it is common that a security administrator installs special software for managing a device and sets the special software to prohibit connection of external storage devices and/or to prohibit connection of BLUETOOTH (registered trademark) devices so as not to allow a general user to change the settings.

Systems employed in information devices, however, do not have mechanisms for separating privileges by passwords owing to the background that such systems have originally been developed for personal use. Accordingly, even if a security administrator installs special software for managing a device and makes various settings for the device, a general user can change the settings. Furthermore, as described above, if it is attempted to develop and distribute special software (device management applications) for managing a device by different organizations, there are risks that the protocols for data communication between the application and the operating system of a device where an event occurs and between the applications are analyzed and that an unauthorized device management application responds to the device where the event has occurred with a wrongly-altered determination result as to whether or not to permit or prohibit execution of the event that has occurred, which leads to alteration of behavior into behavior different from that intended by the security administrator.

DETAILED DESCRIPTION

Figure 1:
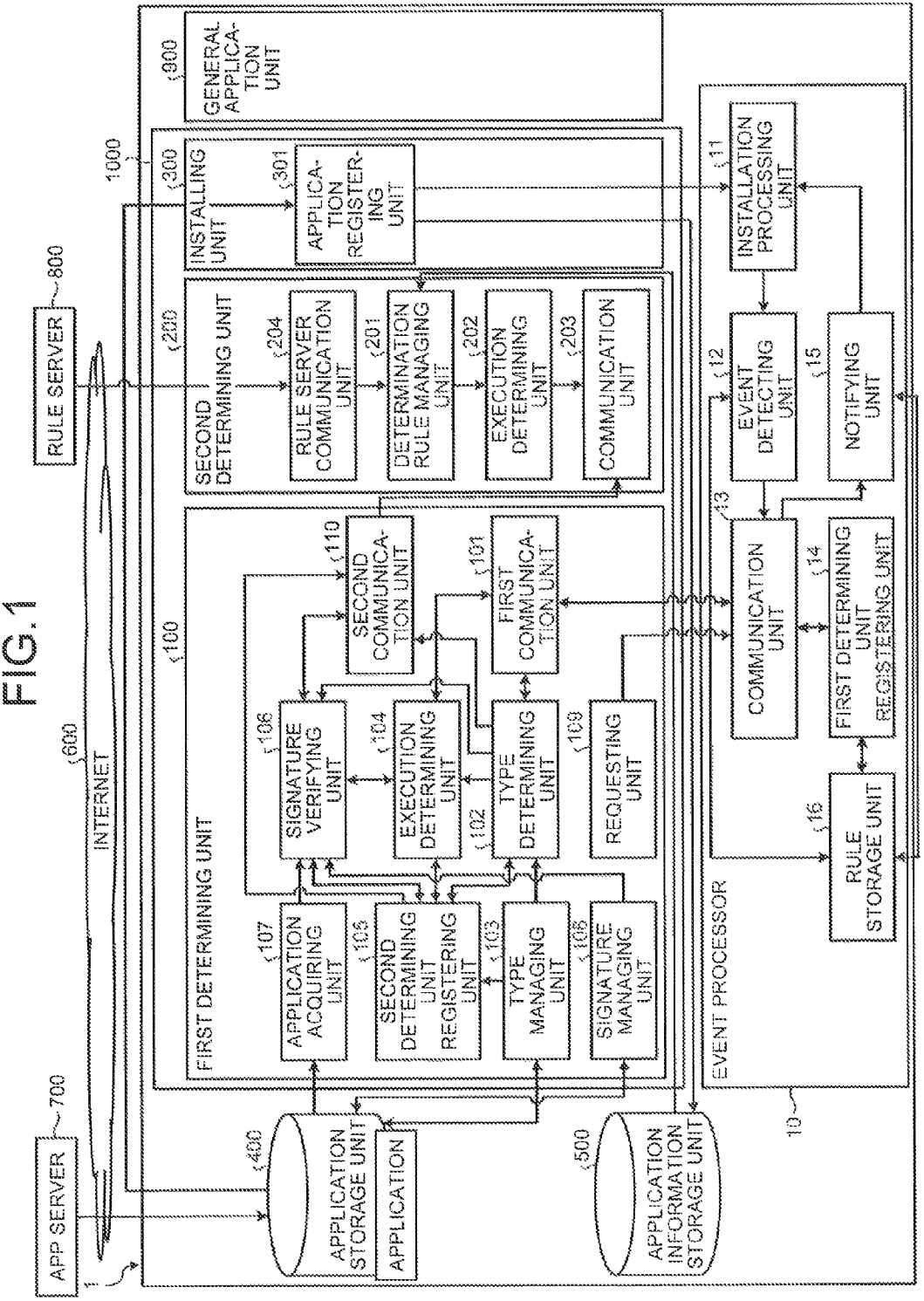
FIG. 1 is a block diagram illustrating a functional configuration of an information processing device according to a first embodiment.

According to an embodiment, an information processing device includes an event processor and a first determining unit. The event processor includes an event detecting unit, a rule storage unit, a first determining unit registering unit, and a communication unit. The event detecting unit is configured to detect an event and suspend execution of the event. The rule storage unit is configured to store first identification information of a first application corresponding to the first determining unit that is configured to perform a determination process of determining whether to permit or prohibit the detected event. The first determining unit registering unit is configured to determine whether the first identification information stored in the rule storage unit and identification information of the first determining unit match with each other when a registration request to transmit an inquiry as to whether to permit or prohibit execution of the event is received from the first determining unit. The first determining unit registering unit is configured to register the first determining unit when the first identification information and the identification information match with each other. The communication unit is configured to transmit the detected event to the registered first determining unit. The first determining unit includes a requesting unit, a signature managing unit, a signature verifying unit, a second determining unit, a first communication unit, and a second communication unit. The requesting unit is configured to transmit the registration request to the event processor at startup of the first determining unit. The signature managing unit is configured to contain second identification information and a public key. The second identification information and the public key are used for verification as to whether a signature for a second application corresponding to a second determining unit is valid. The second determining unit is different from the first determining unit and configured to perform the determination process. The signature verifying unit is configured to receive a registration request from the second application, and verify the signature of the second application with the second identification information and the public key contained in the signature managing unit. The second determining unit registering unit is configured to register the second application as the second determining unit when the verification of the signature is successful. The first communication unit is configured to receive a request for the determination process from the event processor, and transmit a result of the determination process to the event processor. The second communication unit is configured to transfer the received event to the second determining unit registered in the second determining unit registering unit, and receive the result of the determination process from the second determining unit. The event detecting unit cancels suspending of the event and executes the event when the received result of determination indicates permission of the execution.

Embodiments in which an information processing device according to embodiments of the present invention is exemplified will be described in detail below with reference to the drawings. Note that the present invention is not limited to these embodiments. In the embodiments, an application for determining whether to permit or prohibit execution of an event and an application for executing an event are separated. As a result, control for detailed determination can be performed and maintenance in changing rules for determination can be increased.

First Embodiment

Figure 2:
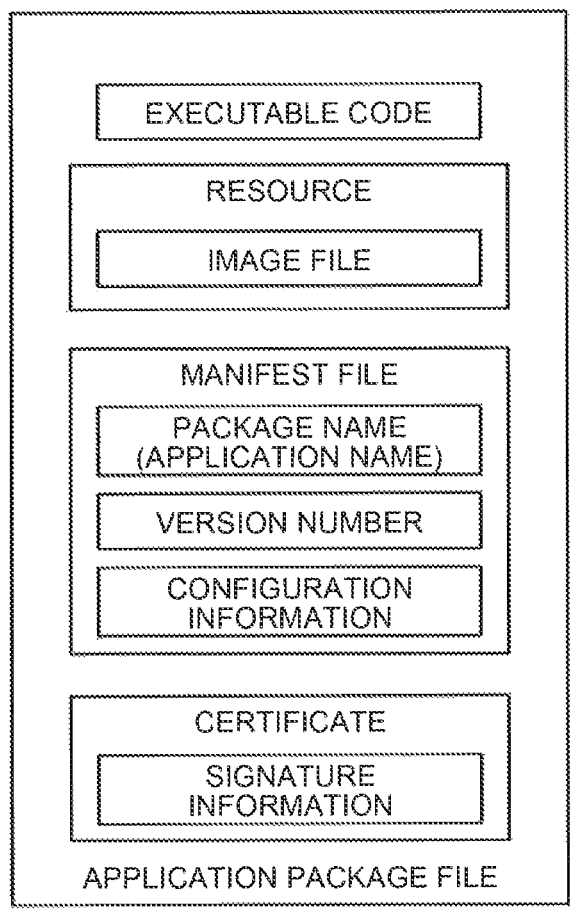
FIG. 2 is a block diagram illustrating a file structure of an application package according to the first embodiment.

FIG. 1 is a block diagram illustrating a functional configuration of an information processing device according to a first embodiment of the present invention. As illustrated in FIG. 1, the information processing device 1 includes an event processor 10, a first determining unit 100, a second determining unit 200, an installing unit 300, a general application unit 900, an application storage unit 400, and an application information storage unit 500. The application storage unit 400 is a storage area in which packages of applications for installation downloaded from an application server 700 and is made of an HDD or the like. The application information storage unit 500 is a database in which information such as a thumbnail image file used as an icon related to an installed application, and is made of an HDD or the like. The first determining unit 100, the second determining unit 200, and the general application unit 900 are application programs. For example, these programs may be Android application programs. The first determining unit 100 is preinstalled in the information processing device 1 in advance, and the second determining unit 200 and the general application unit 900 are distributed as application packages as illustrated in FIG. 2 from the application server 700 and stored in the application storage unit 400. Alternatively, the first determining unit 100 may also be distributed in the form of an application package. An application is distributed from the application server 700 as a compressed application package obtained by compressing a plurality of files into one file, and stored in this state into the application storage unit 400.

An application package contains executable codes of a program, an application name, a version number, configuration information, a certificate, etc., and a resource file and the like such as an image file for thumbnail, for example. A certificate contains signature information, and a public key for verifying the signature. Afterward, information contained in the application package is separated into files by the installing unit 300 when the application is installed, and executable codes and the like are stored into predetermined positions in the application storage unit 400 according to instructions from the configuration information contained in the application package. In addition, a thumbnail image installing unit 300 corresponding to an application to be installed is preinstalled in the information processing device 1 in advance. The installing unit 300 may be an Android application program, a native program, or a combination of both programs.

The event processor 10 is a main part of operating system middleware that performs calling of a function of the operating system by means of a system call or the like, connection of a device, installation of an application, assignment of a memory, process management, and the like. The event processor 10 includes an installation processing unit 11, an event detecting unit 12, a communication unit 13, a notifying unit 15, a rule storage unit 16, and a first determining unit registering unit 14. The installation processing unit receives a notification of application installation received by an application registering unit 301 of an installing unit 300, and performs a process of installing the application. More specifically, the installation processing unit performs a process of expanding and storing executable programs, configuration files, and the like contained in the application package stored in the application storage unit 400. Since the installation processing unit 11 performs installation after receiving a notification of permission for installation from the first determining unit 100 and the second determining unit 200, the installation processing unit 11 first notifies the event detecting unit 12 that installation is requested.

The event detecting unit 12 detects events such as a notification from the installation processing unit 11 or other system calls. The detected event makes a source of the event suspend execution of the event and is notified to the communication unit 13. Note that an event filtering process of notifying the communication unit 13 only of events for which it is necessary to inquire whether execution thereof is permitted or prohibited by the first determining unit 100 and the second determining unit 200 may be performed instead of notifying the communication unit 13 of all the system calls. It is assumed that whether or not an event is one to be notified to the communication unit 13 is registered in the rule storage unit 16 in advance. The communication unit 13 specifies the first determining unit 100 registered in the first determining unit registering unit and inquires whether to permit or prohibit execution of the event. Note that the communication between the first determining unit 100 and the event processor 10 is performed by using signal system calls, for example. The communication unit 13 receives a result of determination as to whether to permit or prohibit execution of the event from the first determining unit 100, and notifies the notifying unit 15 of the determination result. The notifying unit 15 receives the determination result from the communication unit 13 and notifies the event source of the determination result according to the type of the event.

For example, when the event source is the installation processing unit 11, the notifying unit 15 notifies the installation processing unit 11 of the determination result that installation is permitted or prohibited from the first determining unit 100. When the event is connection of an external storage, which will be described later, the notifying unit 15 notifies a storage connection managing unit (not illustrated) of the determination result that connection to the storage is permitted or prohibited.

The rule storage unit 16 stores the types of events to be notified to the communication unit 13 and identification information (corresponding to first identification information) of applications for the first determining unit registering unit 14 to determine that the first determining unit 100 is a certain application. The identification information of applications mentioned herein includes application names. While the description below will be made assuming that the identification information of an application is an application name, the application name can be replaced with identification information of an application, which is not limited to an application name but may be any information that identifies an application. Furthermore, if an inquiry as to whether to permit or prohibit execution of an event is not notified to the first determining unit 100 by the communication unit 13 or if a result of determination as to whether to permit or prohibit execution of an event is not returned from the first determining unit 100 and a time-out occurs, the rule storage unit 16 stores the result of determination as to whether to permit or prohibit execution of the event.

The first determining unit 100 requests the event processor 10 to register a process of the first determining unit 100 at launching the first determining unit 100, and the first determining unit registering unit 14 performs a determination process of determining whether the first determining unit 100 matches with an application name registered in the rule storage unit 16. Only if the first determining unit 100 matches with the application name, the communication unit 13 inquires of the first determining unit 100 about the event detected by the event detecting unit 12. If the first determining unit 100 does not match with the application name, the communication unit 13 transmits no inquiry as to whether to permit or prohibit execution of the event to the first determining unit even if the event is detected by the event detecting unit. If the first determining unit 100 matches with the application name, the application name and the process name of the first determining unit 100 are registered in the first determining unit registering unit 14. The communication unit 13 inquires of the first determining unit 100 identified by the application name or the like registered by the first determining unit registering unit 14 as to whether to permit or prohibit execution of the event. Accordingly, if the first determining unit 100 is not registered by the first determining unit registering unit 14, the inquiry as to whether to permit or prohibit execution of the event is not made and the notifying unit 15 processes the event according to default operating rules set in advance in the rule storage unit 16, for example. Furthermore, if a determination result is not returned and a time-out occurs after elapse of a predetermined time or longer even though the communication unit 13 transmitted an inquiry to the first determining unit 100, the notifying unit 15 also processes the event according to the default operating rules set in the rule storage unit 16.

The first determining unit 100 determines the type of the event about which the inquiry is made from the event processor 10. The determination on the event type is made as to whether or not the event type is installation of the second determining unit 200. If the event type is installation of the second determining unit 200, the first determining unit 100 determines by itself whether or not to permit or prohibit installation of the second determining unit 200. If, on the other hand, the event type is other than installation of the second determining unit 200, the first determining unit 100 transmits the information on the event to the second determining unit 200 so that the determination as to whether to permit or prohibit execution of the event will be made by the second determining unit 200. Note that message exchanging employing interprocess communication, for example, is used for communication between the first determining unit 100 and the second determining unit 200. When the information processing device 1 is Android, message exchanging may be performed by using mechanisms for intents and services.

The first determining unit 100 includes a first communication unit 101, a second communication unit 110, a type determining unit 102, a type managing unit 103, an execution determining unit 104, a second determining unit registering unit 105, a signature verifying unit 106, an application acquiring unit 107, a signature managing unit 108, and a requesting unit 109. The first communication unit 101 transmits/receives data to/from the event processor 10. The second communication unit 110 transmits/receives data to/from the second determining unit 200. For example, the first communication unit 101 receives an inquiry as to whether to permit or prohibit execution of an event received from the event processor 10, and transmits information indicating whether to permit or prohibit the execution of the event to the event processor 10. The second communication unit 110 transmits an inquiry as to whether to permit or prohibit execution of an event to the second determining unit 200, and receives information on a result of the determination as to whether to permit or prohibit execution of the event made by the second determining unit 200.

The type determining unit 102 determines whether the type of an event for which an inquiry as to whether to permit or prohibit execution thereof is made by the event processor 10 is installation of the second determining unit 200 or another event. The type managing unit 103 manages reading/writing of information for determining the type of an event stored in the application storage unit 400, and determination on the type is made on the basis of the information for determining the type acquired via the type managing unit 103. For example, the type managing unit 103 records information such as event names and application names to be used by the type determining unit 102 into the application storage unit 400 when the first determining unit 100 is installed or executed for the first time, and reads information such as event names or application names to be used by the type determining unit 102 from the application storage unit 400 before the type determining unit 102 receives an event.

Specifically, a case in which a manufacturer of the first determining unit 100 permitted in advance a third party to develop the second determining unit 200 capable of cooperating with the first determining unit 100 is assumed. In this case, since the manufacturer can register a determination application that functions as the second determining unit 200 capable of cooperating with the first determining unit 100 in the first determining unit 100, an application having an application name and a signature for the application, for example, that match with expected values of those of the application is determined to be the determination application that functions as the second determining unit 200. Note that the type of the second determining unit 200 registered in the type managing unit 103 may be updated via a network.

The second determining unit registering unit 105 holds identification information indicating whether or not a determination application having an application name managed by the type managing unit 103 is the second determining unit 200 when the execution determining unit 104 determines that an application to be installed is the valid determination application.

If the type of an event transmitted from the event processor 10 is determined to be installation of a determination application that functions as the second determining unit 200, the type determining unit 102 provides information on the event to the execution determining unit 104. If, on the other hand, the type of an event is determined to be other than installation of a determination information, such as installation or another application, uninstallation of an installed application, connection of an external storage, connection of a Bluetooth device, connection of a Wi-Fi (registered trademark) device, or launching an application, the type determining unit 102 transfers information on the event to the second determining unit 200 via the second communication unit 110. In this case, the second communication unit 110 checks whether or not the second determining unit 200, to which the information is transferred, is the determination application that is registered as the second determining unit 200 by the second determining unit registering unit 105. Thus, while it is assumed that the second determining unit 200 is selected freely and installed by the user, for the properly installed second determining unit 200, identification information indicating that a determination application having an application name read from the application storage unit 400 by the type managing unit 103 is the second determining unit 200 is registered in the second determining unit registering unit 105. Accordingly, communication other than communication with a registered second determining unit 200 is not permitted.

The execution determining unit 104 receives, from the signature verifying unit 106, a result of verifying a signature of a determination application that has received an event of installation, and determines whether or not to register information indicating that the determination application is the second determining unit 200 or whether or not to install the determination information. Thus, the execution determining unit 104 transfers information on the event to the signature verifying unit 106. The signature verifying unit 106 acquires a public key for a determination application stored in advance in the application storage unit 400 via the signature managing unit 108 and having the same name as the application name or the like that is the identification information of the acquired event of installation of the second determining unit 200. The public key is developed by the manufacturer of the determination application, and the manufacturer can verify whether the determination application is that developed by the manufacturer by adding a signature to the determination application using an associated secret key to prevent masquerade with an incorrect determination application under the same name.

The application acquiring unit 107 also acquires, from an application package of the application stored in the application storage unit 400, signature information of an application having the same application name as the determination application of the second determining unit 200 for which execution of installation is requested. As illustrated in FIG. 2, the file of the application package contains a signature. The signature is calculated by means of public key cryptography by using the secret key managed by the manufacturer of the determination application. An example of a public key cryptographic algorithm used for the signature calculation may be RSA.

The signature verifying unit 106 verifies whether or not the signature information acquired from the application package by the application acquiring unit 107 can be properly verified by using the public key managed by the signature managing unit 108, that is, whether or not the application is the one developed by the proper manufacturer, and returns a result of verification to the execution determining unit 104. The execution determining unit 104 determines whether or not to register the identification information that the determination application is the second determining unit 200 into the second determining unit registering unit 105 on the basis of the determination result on the signature information at the signature verifying unit 106. If the signature verification is successful, the second determining unit registering unit 105 registers the identification information as the second determining unit 200. If the signature verification is unsuccessful, the determination application having the application name managed by the type managing unit 103 is not the second determining unit 200 and therefore the identification information thereof is not registered. If the signature verification is unsuccessful, the execution determining unit 104 may set the determination result on installation of the determination application to be prohibited or may set the determination result itself on the installation may be permitted but without registration into the second determining unit registering unit 105. If the determination result on the installation is set to be prohibited, the determination application will not be installed, the determination application will thus not be executed, and the first determining unit 100 will not communicate with the determination application. The execution determining unit 104 notifies the event processor 10 of the determination result via the first communication unit 101. The requesting unit 109 requests the first determining unit registering unit 14 of the event processor 10 to register the identification information of the first determining unit 100 at launching of the first determining unit 100.

The signature managing unit 108 writes the public key to be used for registering the determination application as the second determining unit 200 into the second determining unit registering unit 105 into the application storage unit 400 at installation of the application or reads the public key at installation. The determination application is delivered as an application package file from the application server 700. The application package contains the signature information as illustrated in FIG. 2, and the signature managing unit 108 stores and reads out the public key associated with the secret key used for generating the certificate into/from the application storage unit 400. That is, the signature managing unit 108 can identify and acquire the public key of the determination application to be registered as the second determining unit 200. Note that the number of public keys to be managed by the signature managing unit 108 may be more than one.

In addition, if the first determining unit 100 is installed in advance in the information processing device 1, the public key to be used for registration into the second determining unit registering unit 105 is also written into the application storage unit 400 when the application is installed. Furthermore, the developer of the first determining unit 100 may develop a first determining unit 100 of a new version as an application package in which a public key is additionally inserted in the signature managing unit 108 of the first determining unit 100 and distribute the application package from the application server 700. In this case, when the first determining unit 100 of the new version is installed as update in the information processing device 1, the public key managed by the signature managing unit 108 is also updated, and therefore a determination application that can be registered as the second determining unit 200 can be added.

Alternatively, the developer of the first determining unit 100 may develop a first determining unit of a new version as an application package by replacing the public key contained in the signature managing unit 108 of the first determining unit 100 with another public key and distribute the application package from the application server 700. In this case, when the first determining unit 100 of the new version is installed as update, the verification process performed by the signature verifying unit 106 for the determination application registered so far as the second determining unit 200 will be unsuccessful and the determination application will therefore not be registered as the second determining unit 200. The determination application that can be registered as the second determining unit 200 is limited to a determination application signed by using a secret key associated with the new public key managed by the signature managing unit 108 of the first determining unit 100 of the new version. Specifically, it is possible to forcibly register another determination application as the second determining unit 200 without recognizing the determination application registered so far as the second determining unit 200 as the second determining unit 200 by installing the first determining unit 100 as update. This is useful for deleting registration of a determination application that has been registered as the second determining unit 200 in a case where a critical defect is found in the second determining unit 200 or in a case where a false determination application is developed as a result of leakage of a secret key to be used for signature of the determination application, for example.

The second determining unit 200 includes a determination rule managing unit 201, an execution determining unit 202, a rule server communication unit 204 and a communication unit 203. The rule server communication unit 204 is not an essential component. The rule server communication unit 204 communicates with a rule server 800 on the Internet or an intranet to perform a communication process of downloading a determination rule, which will be described later. In order to avoid downloading an incorrect determination rule from an unauthorized rule server 800, an authentication process of authenticating whether the rule server 800 is an authorized server by well-known means such as SSL or SSH may be performed and the communication may further be encrypted in communicating with the rule server 800. The communication unit 203 receives an inquiry as to whether to permit or prohibit execution of an event from the first determining unit 100 and transmits a result of whether to permit or prohibit the execution of the event to the first determining unit 100.

The determination rule managing unit 201 acquires a determination rule for determining whether to permit or prohibit execution of an event from the application storage unit 400 in response to an inquiry as to whether to permit or prohibit the execution of the event, or downloads and stores the determination rule from the rule server 800 via the rule server communication unit 204. For example, the determination rule contains whether to permit or prohibit execution in association with contents of an event execution request (type of system call, specified file name, etc.). An application package of a determination application may be distributed from the application server 700 to the information processing device 1 in a state containing the determination rule as one of resources thereof, and the installing unit 300 may store the determination rule into the application storage unit 400 when installing the determination application as the second determining unit 200. Note that the determination rule managing unit 201 can update the determination rule by downloading the determination rule from the rule server 800 or the like connected via the Internet 600 through the rule server communication unit 204.

Obviously, the configuration may be such that the determination rule is not stored in the application storage unit 400 in the process of installation and that the determination rule managing unit 201 downloads a new determination rule from the rule server 800 or the like and stores the downloaded determination rule into the application storage unit 400.

Alternatively, an updated determination rule may be contained as one of resources in the application package of a determination application for the purpose of updating the determination rule, and the installing unit 300 may overwrite and store the determination rule in the application storage unit 400 by updating the whole determination application at the installing unit 300.

The execution determining unit 202 acquires the stored determination rule via the determination rule managing unit 201, determines whether to permit or prohibit execution of an event according to the determination rule, and notifies the first determining unit 100 of the determination result via the communication unit 203.

The installing unit 300 includes an application registering unit 301. The application registering unit 301 acquires necessary resources from an installation package of an application stored in the application storage unit 400, and requests the event processor 10 to execute installation. When installation is executed, the application registering unit 301 also stores resources such as an icon contained in the application package into the application information storage unit 500, for example.

Figure 3:
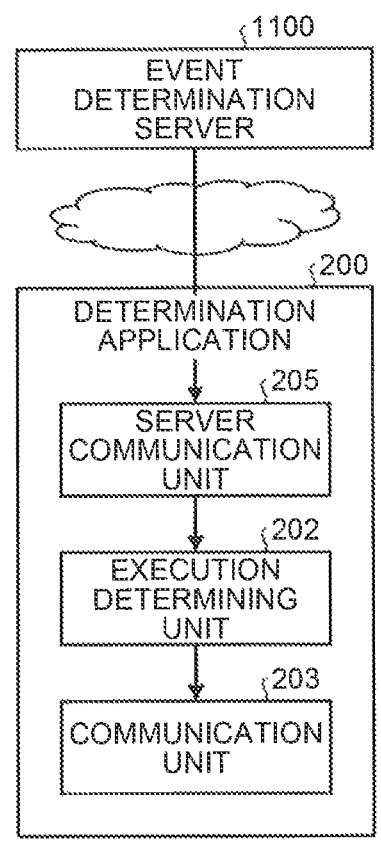
FIG. 3 is a block diagram illustrating another example of a determination application according to the first embodiment.

FIG. 3 is a diagram illustrating another example of the second determining unit 200. As illustrated in FIG. 3, a server communication unit 205 may be provided instead of the determination rule managing unit 201, the server communication unit 205 may communicate with an event determination server 1100 connected via the Internet or an intranet to acquire a determination rule from the event determination server 1100 in real time, and the execution determining unit 202 may determine whether to permit or prohibit execution of an event according to the acquired determination rule. Alternatively, the determination result itself may be acquired in real time from the event determination server 1100, and the execution determining unit 202 may determine whether to permit or prohibit execution of an event according to the acquired determination result. In order to avoid downloading an incorrect determination rule or a false determination result from an unauthorized event determination server 1100, an authentication process of authenticating whether the event determination server 1100 is an authorized server by well-known means such as SSL (Secure Socket Layer), SSH (Secure Shell), or IPSec may be performed and the communication may further be encrypted in communicating with the event determination server 1100.

Figure 4:
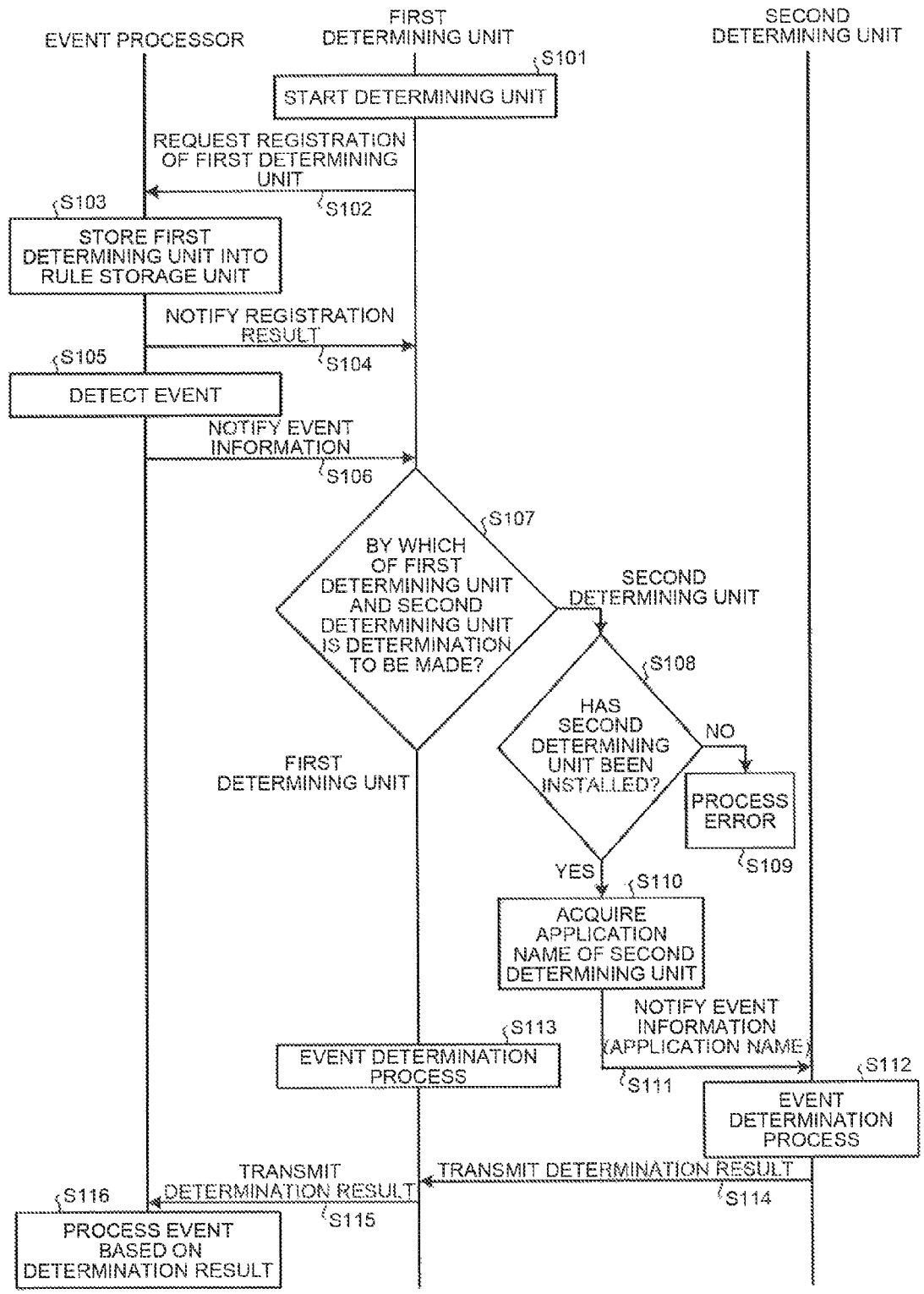
FIG. 4 is a sequence diagram illustrating a flow of processing for determining whether to permit or prohibit execution of an event according to the first embodiment.

Next, a flow of a process for determining whether to permit or prohibit execution of an event according to the present embodiment will be described with reference to FIG. 4. As illustrated in FIG. 4, the process is first started when the first determining unit 100 is started (step S101). The requesting unit 109 of the first determining unit 100 requests the event processor 10 to register the first determining unit 100 (step S102). The first determining unit registering unit 14 of the event processor 10 determines whether or not the first determining unit 100 for which the request is made matches with an application name registered in the rule storage unit 16 (step S103), and notifies the first determining unit 100 of the registration result (step S104). If the first determining unit 100 does not match with the application name, the first determining unit 100 for which the request is made will not be notified of event information even an event is detected by the event processor 10.

Subsequently, the event detecting unit 12 of the event processor 10 detects an event (step S105). Subsequently, the communication unit 13 notifies the first determining unit 100 identified by the application name registered in the first determining unit registering unit 14 of event information (step S106). The type determining unit 102 of the first determining unit 100 determines whether the determination as to whether to permit or prohibit execution of the received event is to be made by the first determining unit 100 or the second determining unit 200 (step S107).

If it is determined that the determination is to be made by the second determining unit 200, the type determining unit 102 checks whether or not the second determining unit 200 is stored in the second determining unit registering unit 105 and has already been installed (step S108). If the second determining unit 200 has been installed, the type determining unit 102 acquires the application name of the second determining unit 200 (step S110), and notifies the event information (step S111). If the second determining unit 200 has not been installed, the type determining unit 102 performs a predetermined error processing (step S109). The second determining unit 200 determines whether to permit or prohibit execution of the event transferred from the first determining unit 100 (step S112), and transmits the determination result to the first determining unit 100 (step S114).

If it is determined in step S107 that the determination is to be made by the first determining unit 100, that is, if the application to be installed is a determination application of the second determining unit 200, the first determining unit 100 determines whether to permit or prohibit execution of the event (step S113). The first determining unit 100 then returns the determination result as to whether to permit or prohibit execution of the event to the event processor 10 (step S115). The installation processing unit 11 of the event processor 10 processes the event on the basis of the determination result (step S116).

Figure 5:
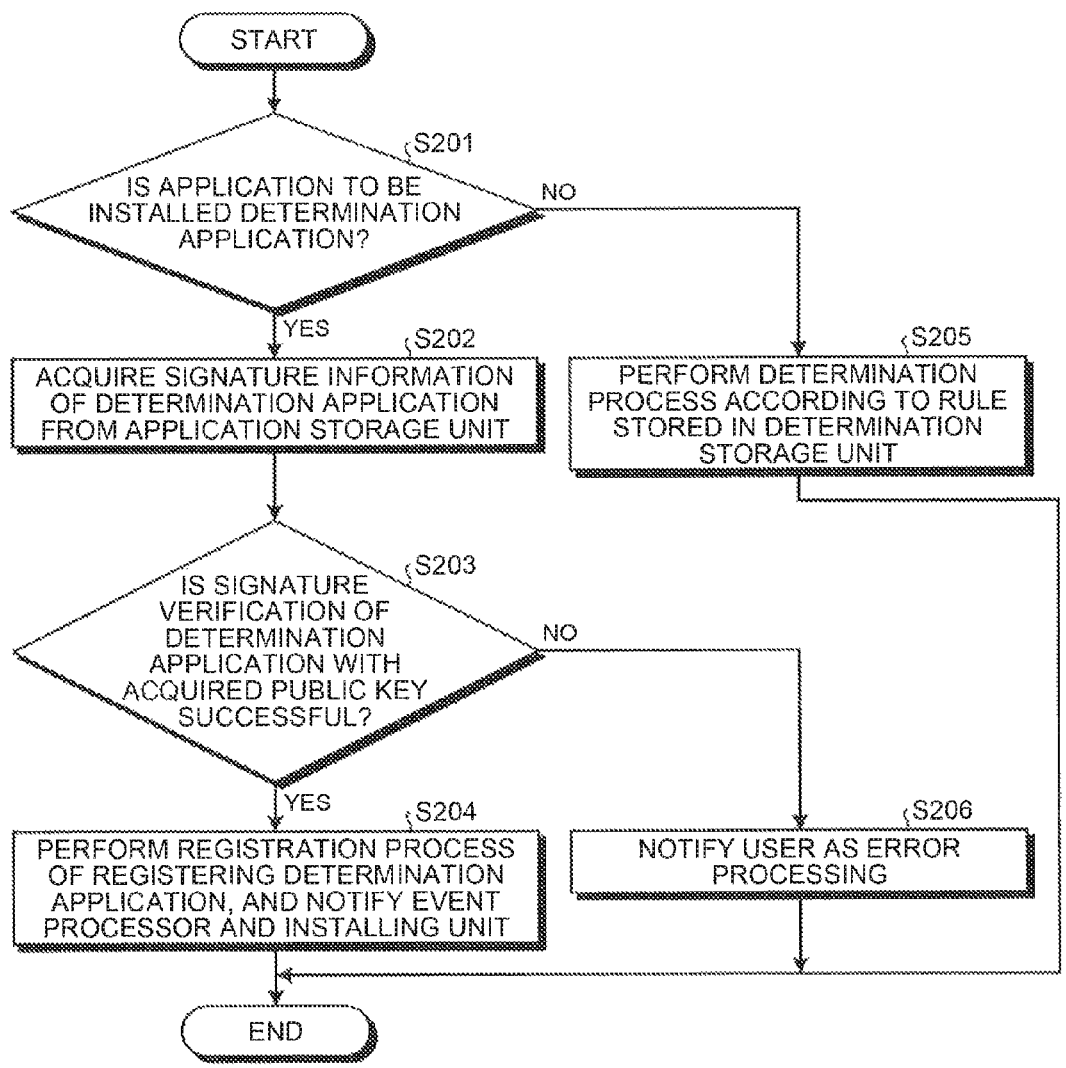
FIG. 5 is a flowchart illustrating a flow of processing for determining whether to permit or prohibit execution of an event of installing a determination application according to the first embodiment.

Next, a flow of a process in a case of an event of installing the second determining unit 200 at the first determining unit 100 will be described with reference to FIG. 5. As illustrated in FIG. 5, the type determining unit 102 first determines whether or not the application to be installed is the second determining unit 200 (step S201). If it is determined that the application is the second determining unit (step S201: Yes), the application acquiring unit 107 acquires signature information of the determination application from the application storage unit 400 (step S202). If, on the other hand, it is determined that the application is not the second determining unit (step S201: No), the determination process is performed by the second determining unit 200 according to the rule stored in the determination rule managing unit 201 and the process is terminated (step S205).

Subsequently, the signature verifying unit 106, for which the acquired signature information of the determination application is pre-stored in the signature managing unit 108, performs the verification process by using the public key acquired from the signature managing unit 108 and determines whether or not the verification process is successful (step S203). If the verification is determined to be successful (step S203: Yes), the second determining unit registering unit 105 performs the registration process of registering the second determining unit 200, and notifies the event processor 10 and the installing unit 300 (step S204). If, on the other hand, the verification is determined to be unsuccessful (step S203: No), the execution determining unit 104 notifies as error processing (step S206).

With the information processing device 1 according to the present embodiment as described above, the first determining unit 100 and the second determining unit 200 are provided separately, the first determining unit 100 processes an event of installing the second determining unit 200 but other events are processed by the second determining unit 200. Accordingly, the information processing device 1 can be applied to a situation in which a plurality of organizations develops and distributes applications separately.

Moreover, since the first determining unit 100 registers identification information of the second determining unit 200 permitted to be installed and exchanges information on an event only with the second determining unit 200 for which registration is successfully completed, the security risk can be reduced.

Furthermore, in order to determine whether or not the second determining unit 200 may be installed, by pre-storing a public key of the installation-permitted second determining unit 200 in the application storage unit 400 via the signature managing unit 108 and by verifying signature information of the second determining unit 200 requested to be installed using the public key, it is possible to set which application can be installed among different organizations in advance and prevent installation of unauthorized applications.

Second Embodiment

Next, an information processing device 1 according to a second embodiment will be described. In the first embodiment, registration of a determination application as the second determining unit 200 into the second determining unit registering unit 105 of the first determining unit 100 is triggered by detection of an event or installing the determination application by the event processor 10. The present embodiment is different therefrom in that it is verified whether or not the determination application installed as the second determining unit 200 is valid before transmitting exchanging of event information to the second determining unit 200 from the second communication unit 110 of the first determining unit 100, and only if the verification is successful, an event transmitted from the event processor 10 thereafter is transmitted to the second determining unit 200.

Figure 6:
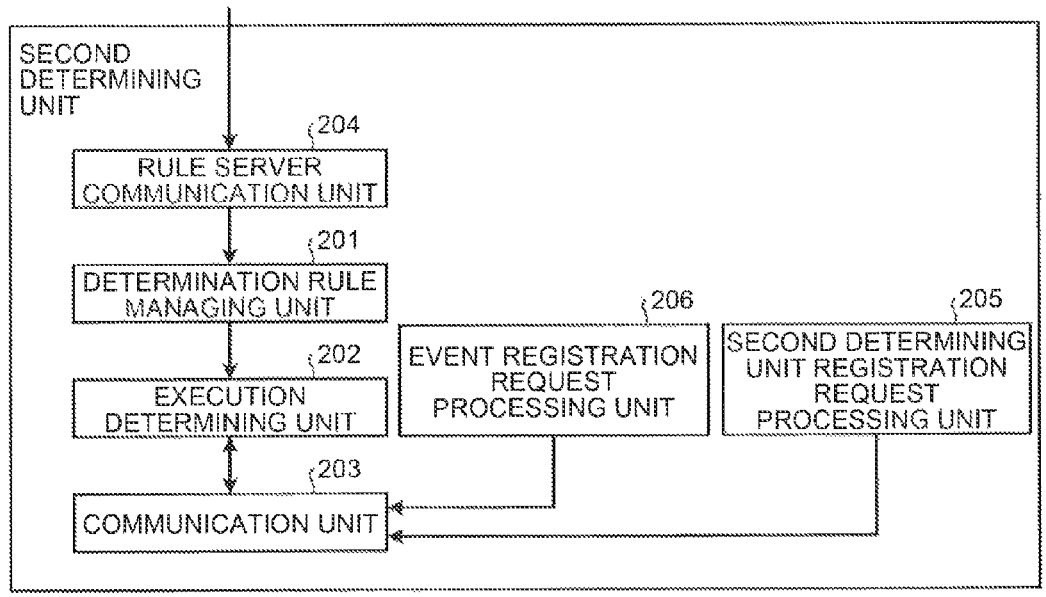
FIG. 6 is a block diagram illustrating a functional configuration of a second determining unit according to a second embodiment.

FIG. 6 is a block diagram illustrating a functional configuration of the second determining unit 200 according to the second embodiment. The second determining unit 200 is different from that illustrated in FIG. 1 in that the second determining unit 200 additionally includes a second determining unit registration request processing unit 205 and an event registration request processing 206.

The second determining unit registration request processing unit 205 transmits a registration request requesting to register a determination application as the second determining unit 200 in the second determining unit registering unit 105 of the first determining unit 100.

The event registration request processing unit 206 transmits an event registration request notifying the first determining unit 100 of the determination on which event among the events detected by the event processor 10 is to be permitted or prohibited is to be made by the second determining unit 200. Specifically, the determination rule managing unit 201 stores a determination rule for an event for which the event registration request processing unit 206 requests the second determining unit 200 to make the determination. For example, it is assumed that the event detecting unit 12 of the event processor 10 can detect events such as an application installation event, an external storage connection event, a Bluetooth device connection event, a Wi-Fi device connection event, an application startup event and an application uninstallation event.

A case in which the second determining unit 200 makes determination for an external storage connection event and an application launch event among these events while the first determining unit 100 makes determination for the other events is assumed. In this case, when an external storage connection event or an application launch event occurs, the event registration request processing unit 206 of the second determining unit 200 requests the first determining unit 100 to transmit the event and the content thereof to the second determining unit 200.

Furthermore, the determination rule managing unit 201 of the second determining unit 200 acquires determination rules for an external storage connection event and an application launch event via the rule server communication unit 204. Even when the second determining unit 200 makes determination only for an external storage connection event and an application startup event, the determination rule managing unit 201 may be configured to be capable of acquiring determination rules for all types of events.

Figure 7:
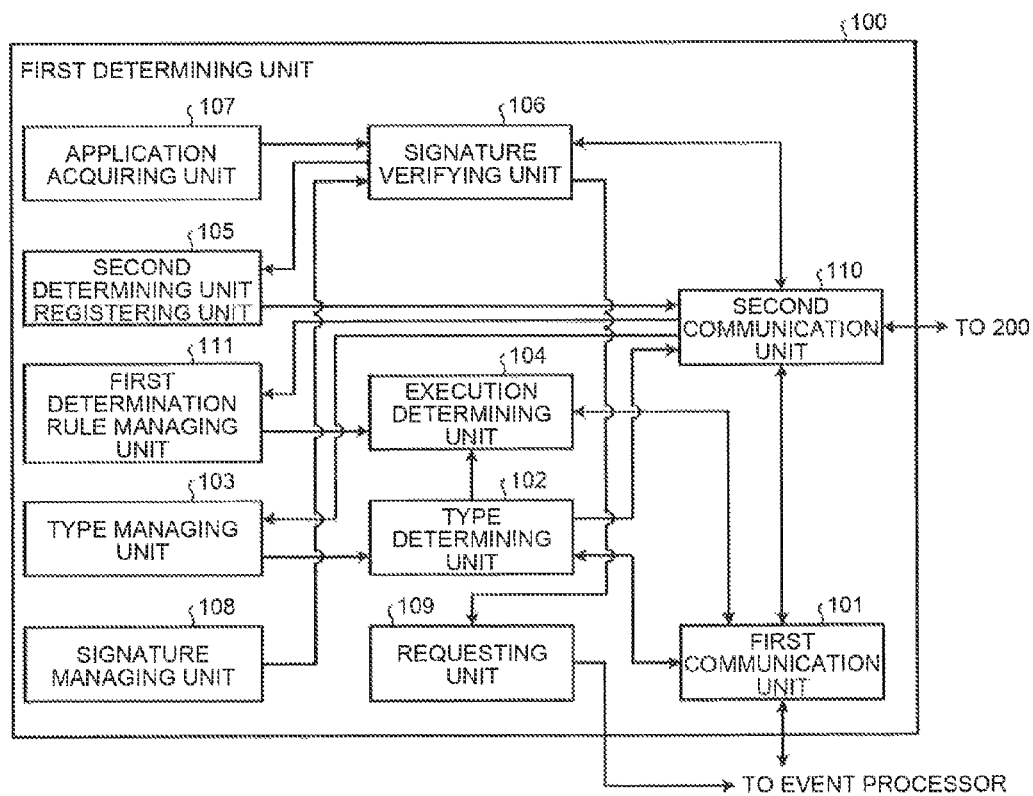
FIG. 7 is a block diagram illustrating a functional configuration of a first determining unit according to the second embodiment.

FIG. 7 is a block diagram illustrating a functional configuration of the first determining unit 100 according to the second embodiment. As illustrated in FIG. 7, the first determining unit 100 of the second embodiment additionally includes a first determination rule managing unit 111.

The first determination rule managing unit 111 can acquire and store a determination rule for an event for which the first determining unit 100 makes determination similarly to the determination rule managing unit 201 of the second determining unit 200.

The execution determining unit 104 acquires a determination rule via the first determination rule managing unit 111, determines whether to permit or prohibit execution of an event according to the determination rule, and notifies the event processor 10 of the determination result via the first communication unit 101. Similarly to the second determining unit 200, the determination rule may be updated through communication with the rule server or the determination rule may be updated by installing as update an application package containing an updated determination rule as the first determining unit 100.

The type managing unit 103 registers or acquires information such as an event name or an application name for the type determining unit 102 to determine whether an event is to be processed by the second determining unit 200 or the first determining unit 100, but the difference from the first embodiment lies in that the event name or the application name is updated by the second determining unit 200.

In the second embodiment, the second determining unit 200 notifies the first determining unit 100 of determination on which event among the events detected by the event processor 10 is to be permitted or prohibited is to be made by the second determining unit 200. The type managing unit 103 overwrites the information according to the notification received via the second communication unit 110. For example, it is assumed that the type managing unit 103 registers information so that the type determining unit 102 will determine that all events are processed by the execution determining unit of the first determining unit 100 immediately after launch of the first determining unit 100. In this case, the rule information in the type managing unit 103 is updated so that the type determining unit 102 determines to transmit an external storage connection event and an application launch event among the events received from the event processor to the second determining unit via a second communication unit when requests to transmit an external storage connection event and an application launch event to the second determining unit 200 is received from the second determining unit 200.

Furthermore, in the second embodiment, registration of a determination application as the second determining unit 200 by the second determining unit registering unit 105 is triggered by a registration request from the second determining unit registration request processing unit 205 of the second determining unit 200 instead of being triggered by an installation event. Accordingly, installation itself of a determination application is not restricted. Of course, the first determination rule managing unit 111 manages a list of application names of applications restricted (prohibited) to be installed, and if the application name of a determination application is in the list, the determination application having the application name will not be installed. Similarly, the configuration may be such that the first determination rule managing unit 111 manages a list of application names of applications permitted to be installed, and if the application name of a determination application is not in the list, the determination application having the application name will not be installed.

A state in which the execution determining unit 104 permitted installation of a determination application and the determination application is installed is assumed here. In this state, it is assumed that a registration request requesting to register the determination application as the second determining unit 200 is transmitted from the second determining unit registration request processing unit 205. When the first determining unit 100 receives the registration request via the second communication unit 110, the signature verifying unit 106 checks whether or not the determination application for which the request is transmitted has a correct application name as the second determining unit 200 and whether or not verification of a signature of the application with a public key managed by the signature managing unit 108 is successful. For the processing procedures, the signature information acquired from the application package by the application acquiring unit 107 is used similarly to the first embodiment. If the check is successful, the determination application for which the request is transmitted is registered as the second determining unit 200 in the second determining unit registering unit 105, and the second communication unit 110 is instructed to receive requests from the determination application thereafter. If the check is unsuccessful, requests from the determination application will be rejected thereafter.

Note that the configuration may be such that the requesting unit 109 requests the first determining unit registering unit 14 of the event processor 10 to register identification information of the first determining unit 100 only when the process for verifying a determination application performed by the signature verifying unit 106 is successful. Thus, if the verification process performed by the signature verifying unit 106 is not successful, events detected by the event detecting unit 12 of the event processor 10 may be determined to be permitted or prohibited according to a rule in the rule storage unit 16 without notifying the first determining unit 100 of the events by the event processor 10. If the determination application verification process performed by the signature verifying unit 106 is successful and the determination application for which the request is transmitted is registered as the second determining unit 200 in the second determining unit registering unit 105, the requesting unit 109 of the first determining unit 100 requests to register the identification information of the first determining unit 100, which is then registered in the first determining unit registering unit 14 of the event processor 10. Thereafter, events detected by the event detecting unit 12 will be notified to the first determining unit 100 via the communication unit.

This is particularly useful when one device is used both for business and for general consumers. In the use for general consumers, events as detected by the event detecting unit 12 need not be limited to those such as installation or launch of an application. In this case, if a determination application to be the second determining unit 200 is not installed, the second determining unit 200 will not transmit a registration request, the signature verifying unit 106 will not instruct the requesting unit 109 to register the first determining unit 100, and as a result, the event processor 10 will not register the first determining unit 100 in the first determining unit registering unit 14, and the events are determined to be permitted or prohibited according to the rule in the rule storage unit 16.

The rule storage unit 16 in this case sets a rule that restrict (prohibit) no events. Accordingly, in the use for general consumers, events detected by the event detecting unit 12 are not particularly restricted. In the use for business, it is necessary to apply various restrictions to the device according to the security policy of the administrator, and a determination application is installed as the second determining unit 200 in such a case. If the second determining unit 200 is configured to transmit a registration request to the first determining unit 100, the first determining unit 100 transmits a registration instruction via the requesting unit 109, and as a result, the event processor 10 will instruct the communication unit 13 to transmit events to the first determining unit 100 so that determination for various events can be made by the first determining unit 100 or the second determining unit 200.

Furthermore, the configuration may be such that, only if the determination application verification process performed by the signature verifying unit 106 is successful, the requesting unit 109 updates an operation rule stored in the rule storage unit 16 of the event processor 10 to update the type of events to be notified to the first determining unit 100 and the default operation rule. In this case, the communication unit 13 and the rule storage unit 16 are connected in addition to the configuration of FIG. 1.

For example, the first determining unit 100 requests registration of the identification information of the first determining unit 100 by the requesting unit 109 at launch to register the identification information in the first determining unit registering unit 14 of the event processor 10. In this case, it is assumed that a default configuration in which the first determining unit 100 is notified of application installation events in a state where the first determining unit 100 is registered in the first determining unit registering unit 14 while the other events are processed according to rules stored in the rule storage unit 16 of the event processor 10 is registered in the rule storage unit 16 of the event processor 10.

Specifically, if the event detecting unit 12 of the event processor 10 detects an application installation event before the determination application verification process performed by the first determining unit 100 is successful, the first determining unit 100 is notified of the event and determines whether to permit or prohibit the application installation event according to a determination rule stored in the first determination rule managing unit 111.

For an event other than application installation events, the first determining unit 100 is not notified of the event and determination as to whether to permit or prohibit the event is made according to a rule stored in the rule storage unit 16 of the event processor 10. When the determination application verifying process performed by the first determining unit 100 is successful and the determination application is registered in the second determining unit registering unit 105, the requesting unit 109 of the first determining unit 100 updates the content of the rule storage unit 16 of the event processor 10 so that the rule storage unit 16 notifies the first determining unit 100 of all the events. Thereafter, events detected by the event detecting unit 12 of the event processor 10 will be notified to the first determining unit 100.

With such a configuration, some events are processed only by the first determining unit 100 even when the second determining unit 200 is not installed and complicated events can be processed by the second determining unit 200 after the second determining unit 200 is installed. Since transmission/reception of events between the event processor 10 and the first determining unit 100 can be reduced until the second determining unit 200 is installed, the event processor 10 can perform determination processes at high speed.

Furthermore, when the verification process performed by the signature verifying unit 106 is successful, the first determination rule managing unit 111 may be updated. While determination as to whether to permit or prohibit an event to be processed by the second determining unit 200 as a result of a request from the second determining unit 200 is made according to a determination rule in the determination rule managing unit 201 of the second determining unit 200, determination as to whether to permit or prohibit an event for which no request is made is made according to a determination rule managed by the first determination rule managing unit 111. In this case, a determination rule that originally permits the event may be updated to prohibit the event.

Alternatively, the second determining unit 200 may transmit an explicit request for updating information on an event for which determination is to be made to the first determination rule managing unit 111, or may transmit a request to the first determining unit 100 to update the rule in the first determining unit 100 indicating whether to permit or prohibit an event for which determination is to be made. For example, configuration of the following policy is considered: for an external storage connection event or an application launch event, determination as to whether to permit or prohibit the event is made by the second determining unit 200 on the basis of the content of the event each time an event occurs according to the serial number of the external storage or the application name of the application that is started, whereas for a Bluetooth connection event, connection is always prohibited regardless of the Bluetooth device to be connected. In this case, if the type managing unit 103 is configured to make the execution determining unit 104 process a Bluetooth connection event and if the determination rule relating to Bluetooth in the first determination rule managing unit 111 of the first determining unit 100 is set to always prohibit connection, messages on the events will not be transmitted to the second determining unit 200 and the event processor 10 is notified that connection of Bluetooth devices is prohibited.

Figure 8:
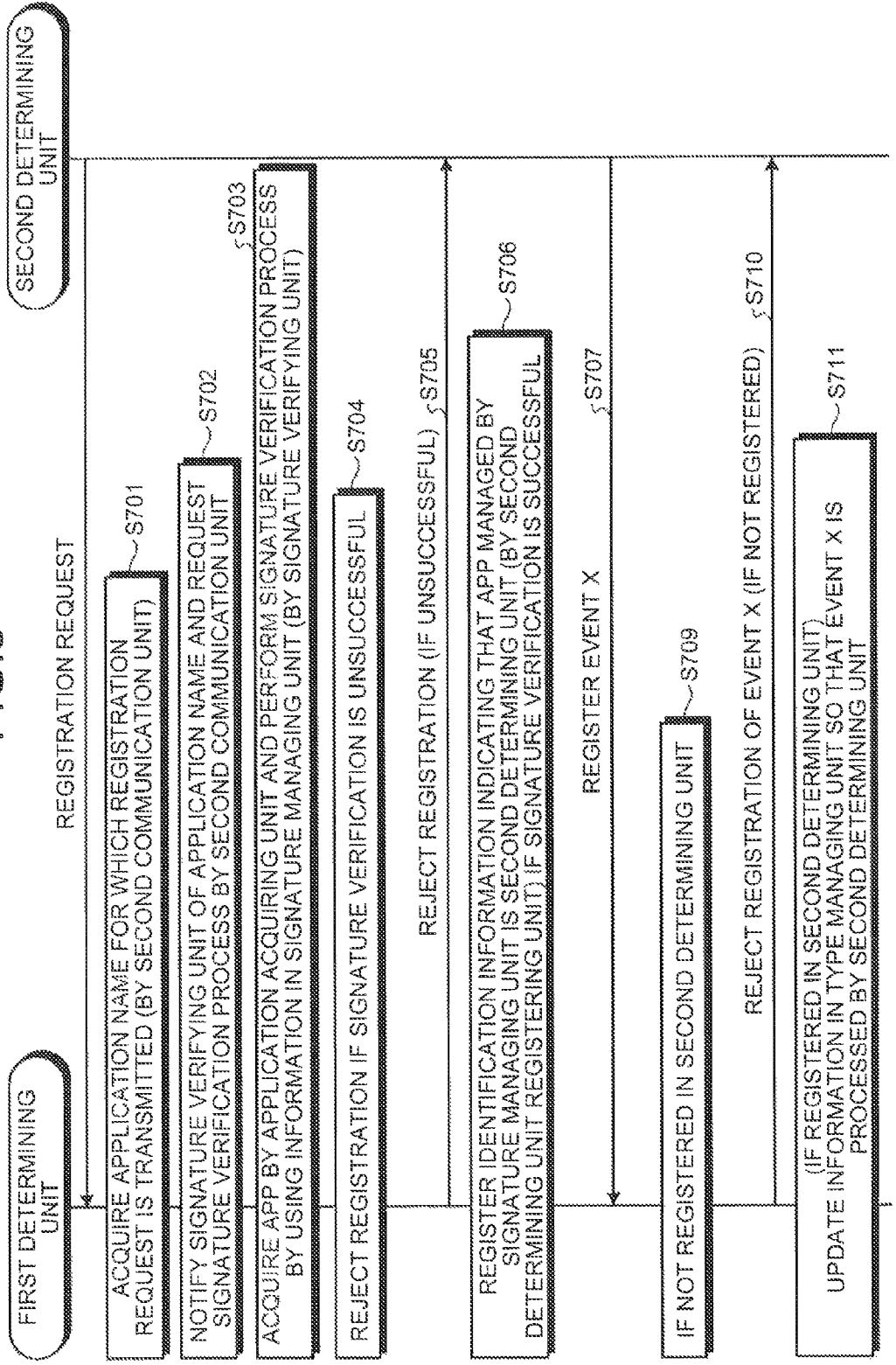
FIG. 8 is a sequence diagram illustrating a flow of an event registration process according to the second embodiment.

A flow of processing in the present embodiment described above will be described with reference to FIG. 8. As illustrated in FIG. 8, when the second determining unit registration request processing unit 205 of the second determining unit 200 first transmits a registration request to the first determining unit 100, the second communication unit 110 of the first determining unit 100 acquires the application name of the application for which the registration request is transmitted (step S701). Subsequently, the second communication unit 110 notifies the signature verifying unit 106 of the application name to request a signature verification process (step S702).

The signature verifying unit 106 acquires an application package identified by the application name by the application acquiring unit 107, and performs the signature verification process by using a public key that can be acquired via the signature managing unit 108 (step S703). If the signature verification process is unsuccessful, the second determining unit registering unit 105 rejects registration of the application (step S704), and notifies the second determining unit 200 of the same (step S705) or disconnects from the second determining unit. If, on the other hand, the signature verification process is successful, the second determining unit registering unit 105 registers the identification information of the application managed by the signature managing unit 108 as the second determining unit 200 (step S706).

In addition, the second determining unit 200 requests the first determining unit 100 to perform a registration process of registering the type of events for which determination as to whether to permit or prohibit execution thereof is made by the second determining unit 200 (step S707). The first determining unit 100 checks whether or not the event type is registered in the second determining unit registering unit 105 (step S709), and if the event type is not registered, notifies the second determining unit 200 of rejection of registration of the event (step S710).

If the event type is registered in the second determining unit registering unit 105, the type managing unit 103 updates the information so that determination as to whether to permit or prohibit execution of the specified type of event is made by the second determining unit 200 (step S711). In the present embodiment, it is determined whether to make the determination in step S107 of the first embodiment illustrated in FIG. 4 by the first determining unit 100 or the second determining unit 200 depending on whether the type managing unit 103 registers the identification information indicating the notified event.

Third Embodiment

Next, an information processing device 1 according to a third embodiment will be described. The present embodiment is different in that, in a case of an application installation event, it is checked whether or not the same application is already installed and an update process is performed if the same application is installed.

Figure 9:
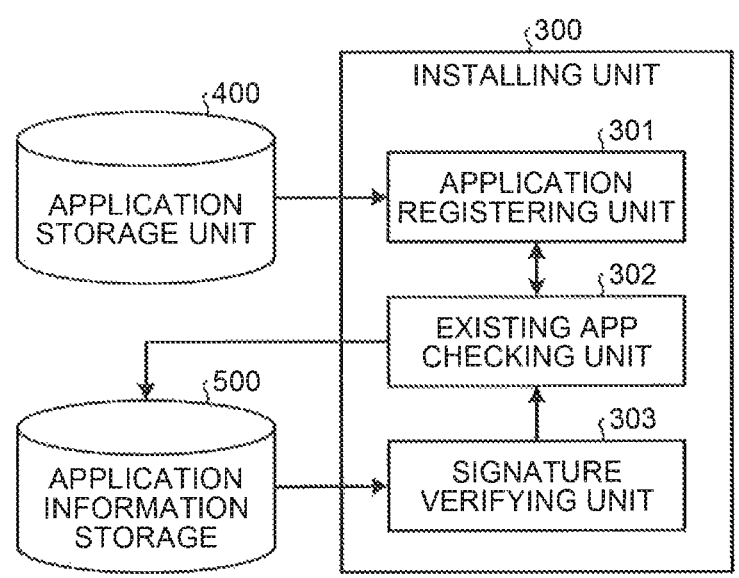
FIG. 9 is a block diagram illustrating a functional configuration of an installing unit according to a third embodiment.

FIG. 9 is a block diagram illustrating a functional configuration of an installing unit 300 according to the present embodiment. As illustrated in FIG. 9, the installing unit 300 additionally includes a signature verifying unit 303 and an existing application checking unit 302. The existing application checking unit 302 checks whether or not an application having the same name is already installed when the application registering unit 301 instructs to process an application installation event. Specifically, the existing application checking unit 302 performs a process of checking whether or not an application having the same application name is registered in the application information storage unit 500. If an application of the same name is installed, the signature verifying unit 303 determines whether or not the public key contained in the certificate of the installed application and the public key contained in the certificate of the application to be newly installed match with each other so as to determine whether or not the secret key used for the signature of the installed application acquired from the application information storage unit 500 and the secret key used for the signature of the application to be newly installed acquired from the application storage unit 400 match with each other.

Figure 10:
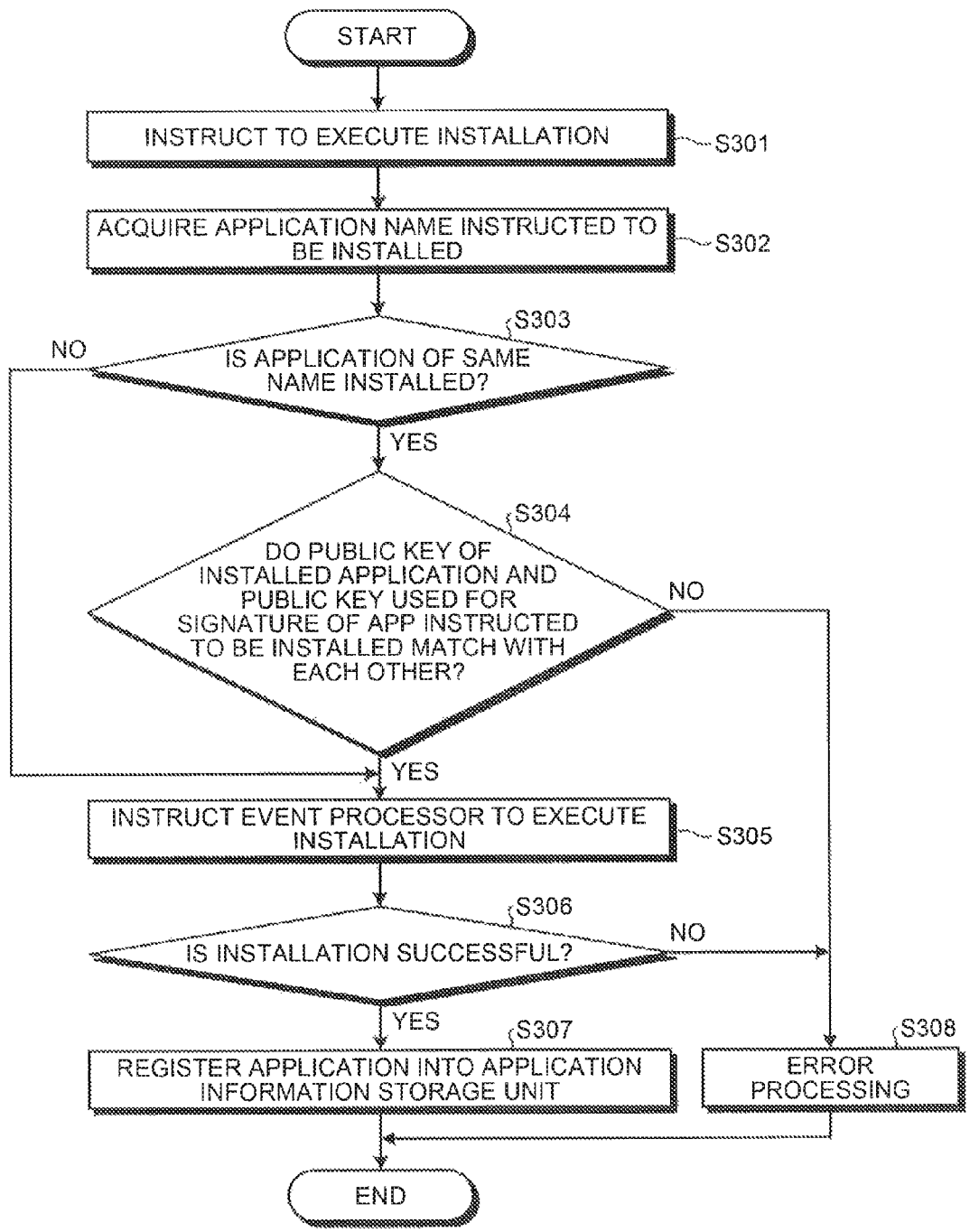
FIG. 10 is a flowchart illustrating a flow of processing for determining whether to permit or prohibit execution of an event of installing an application according to the third embodiment.

FIG. 10 is a flowchart illustrating a flow of processing for installation. As illustrated in FIG. 10, the application registering unit 301 first provides instructions to execute installation (step S301). When the instructions to execute installation are provided, the application registering unit 301 acquires information such as the application name of the application from the application storage unit 400 (step S302). The existing application checking unit 302 determines whether an application having the same name as the acquired application name is already installed on the basis of data in the application storage unit 400 (step S303). If it is determined that an application of the same name is installed (step S303: Yes), the signature verifying unit 303 determines whether or not the public key contained in the certificate of the installed application and the public key contained in the certification of the application package instructed to be installed match with each other (step S304).

If it is determined that the public keys do not match each other (step S304: No), error processing is performed without installing the application (step S308). If, on the other hand, it is determined that the public keys match each other (step S304: Yes), the application registering unit 301 instructs the event processor 10 to execute installation (step S305). Even if it is determined that an application of the same name is not installed (step S303: No), the event processor 10 is also instructed to execute installation (step S305). The installation is then permitted and it is determined whether or not the installation is successful (step S306). If the installation is successful (step S306: Yes), necessary data are stored into the application storage unit 400, and the process is terminated (step S307). If the installed application exists, the data are overwritten. If, on the other hand, the installation is unsuccessful (step S306: No), predetermined error processing is performed (step S308).

With the information processing device 1 of the present embodiment described above, it is possible to perform signature verification of an application and determine whether to permit or prohibit execution of installation thereof at the installing unit 300 when an application of the same name is registered.

Fourth Embodiment

Figure 11:
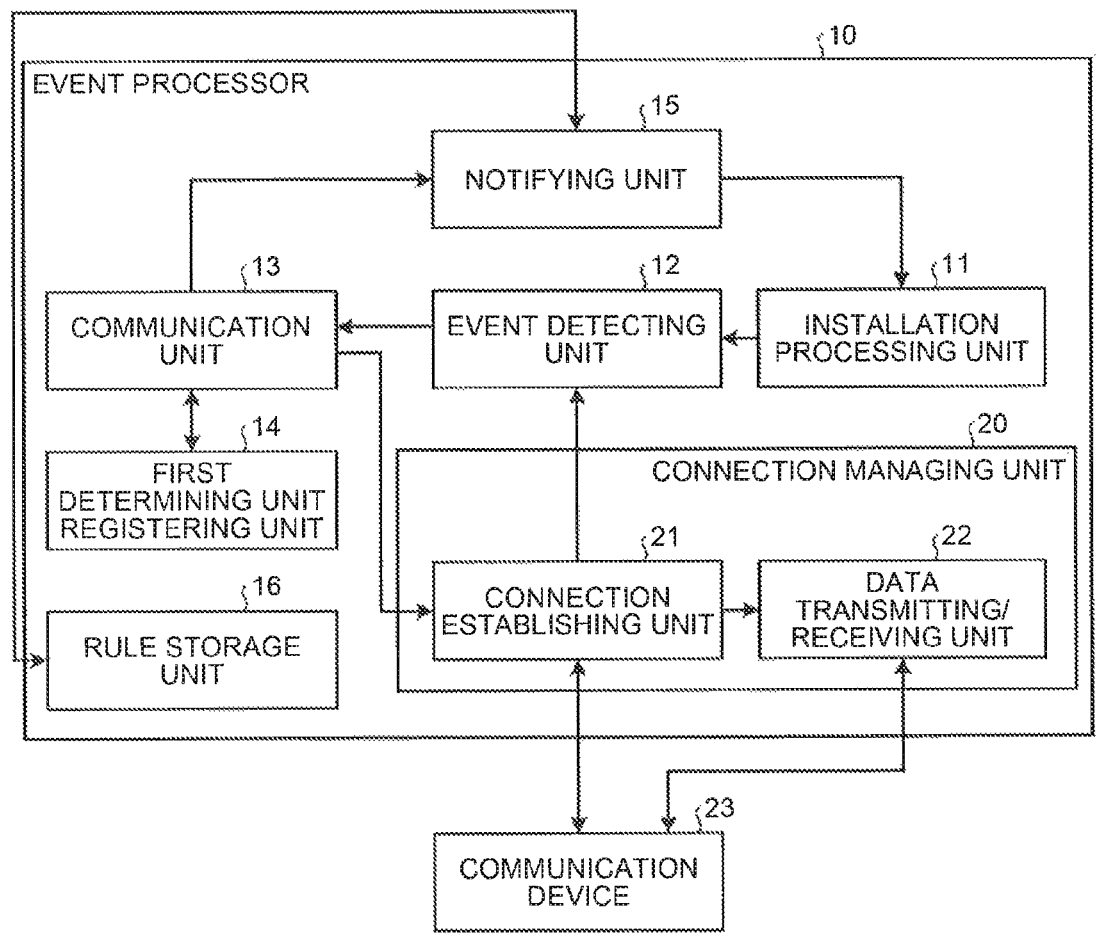
FIG. 11 is a block diagram illustrating a functional configuration of an event processor according to a fourth embodiment.

Next, a fourth embodiment will be described. In the fourth embodiment, a case in which the type of an event is a communication connection process will be described. FIG. 11 is a block diagram illustrating a functional configuration of an event processor according to the present embodiment. As illustrated in FIG. 11, the event processor 10 additionally includes a connection managing unit 20. When an event is detected, the connection managing unit 20 establishes connection with a device to communicate with, acquires information necessary for determination on execution of the event, and performs control to enable communication when the event is permitted. The connection managing unit 20 includes a connection establishing unit 21 and a data transmitting/receiving unit 22. The connection establishing unit 21 detects connection with a communication device 23 to be connected, and maintains the connection. The communication device 23 is a wireless LAN access point in the case of a Wi-Fi connection, or a Bluetooth keyboard in the case of a Bluetooth connection, for example. The data transmitting/receiving unit 22 transmits/receives data to/from the communication device 23 on the basis of the information on the communication device 23 acquired by the connection establishing unit 21.

Figure 12:
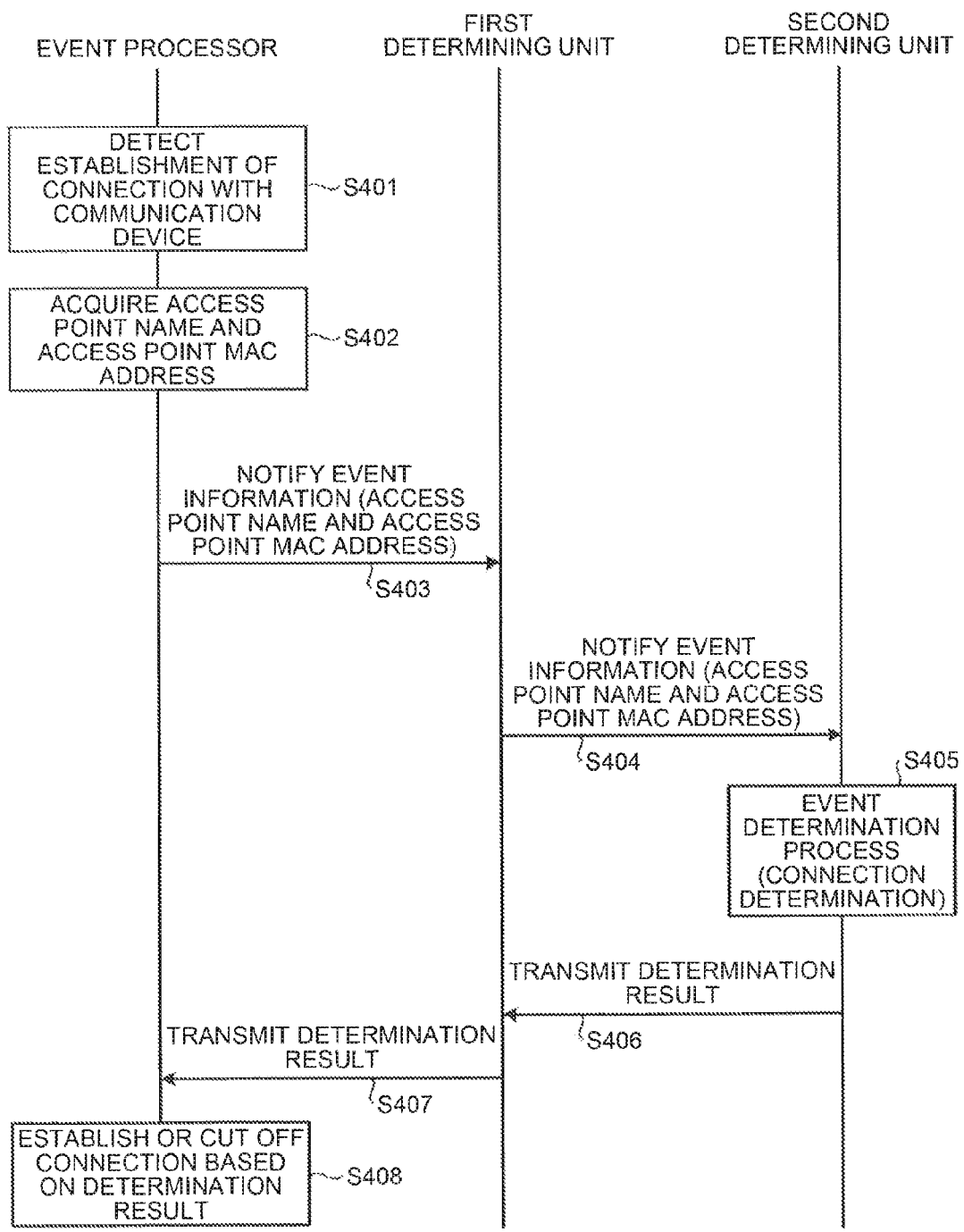
FIG. 12 is a sequence diagram illustrating a flow of processing for determining whether to permit or prohibit execution of an event according to the fourth embodiment.

FIG. 12 is a sequence diagram illustrating a flow of event processing for connection establishment. An example of a Wi-Fi connection is illustrated in FIG. 12. As illustrated in FIG. 12, the connection establishing unit 21 of the event processor 10 first detects establishment of connection with the communication device 23 (step S401). Subsequently, the connection establishing unit 21 acquires an access point name and an access point MAC address of the communication device 23 (step S402). At this point, the connection with the access point is not yet completed. The communication unit 13 notifies the first determining unit 100 of event information containing the access point name and the MAC address acquired by the connection establishing unit 21 (step S403). Since the content of the event is to be processed by the second determining unit 200, the first determining unit 100 notifies the second determining unit 200 of the event information containing the acquired access point name and MAC address (step S404). The second determining unit 200 performs an event determining process on the basis of the received information to determine whether or not to permit the connection (step S405). The second determining unit 200 transmits the determination result to the first determining unit 100 (step S406), and the first determining unit 100 transfers the received determination result to the event processor 10 (step S407). The event processor 10 then performs a process of either establishing or cutting off the connection on the basis of the received determination result (step S408).

Figure 13:
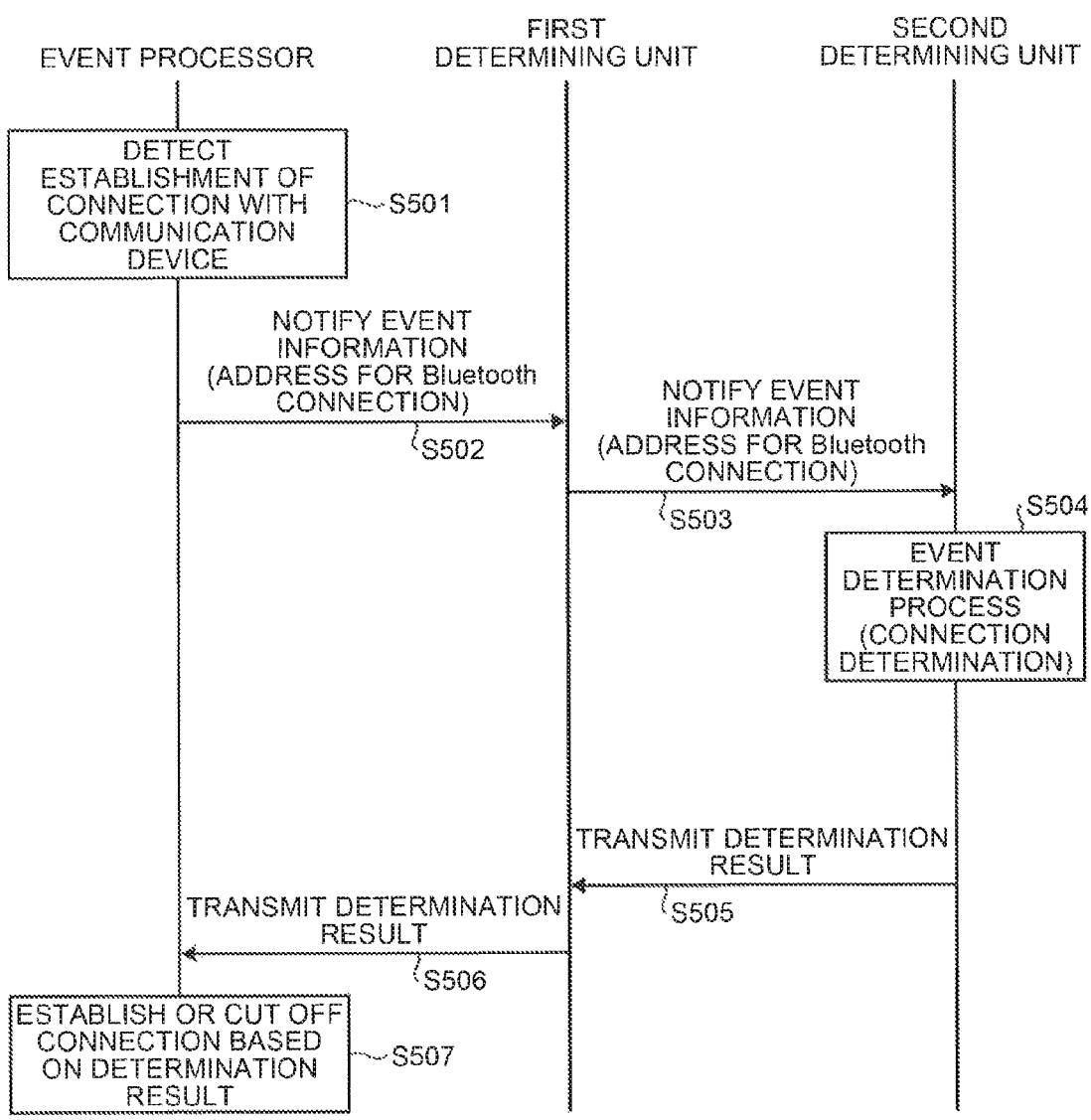
FIG. 13 is a sequence diagram illustrating a flow of processing for determining whether to permit or prohibit execution of an event according to the fourth embodiment.

FIG. 13 is a sequence diagram illustrating a flow of event processing for connection establishment with a Bluetooth client. An example of a connection with BLUETOOTH (registered trademark) is illustrated in FIG. 13. As illustrated in FIG. 13, the connection establishing unit 21 of the event processor 10 first detects that a Bluetooth connection establishment request message is attempted to be transmitted to the communication device 23 (step S501). Subsequently, the connection establishing unit 21 acquires a Bluetooth address of the communication device 23. At this point, the Bluetooth connection with the communication device 23 is not yet completed. The communication unit 13 notifies the first determining unit 100 of event information of the acquired Bluetooth connection establishment request event for Bluetooth connection with the communication device 23 and the Bluetooth address of the device to communicate with (step S502). Since the content of the event is to be processed by the second determining unit 200, the first determining unit 100 notifies the second determining unit 200 of the event information of the acquired Bluetooth connection establishment request event for Bluetooth connection with the communication device 23 and the Bluetooth address of the device to communicate with (step S503). The second determining unit 200 performs an event determining process on the basis of the received information to determine whether or not to permit the connection (step S504). The second determining unit 200 transmits the determination result to the first determining unit 100 (step S505), and the first determining unit 100 transfers the received determination result to the event processor 10 (step S506). The event processor 10 then performs a process of either establishing or cutting off the connection on the basis of the received determination result (step S507).

Figure 14:
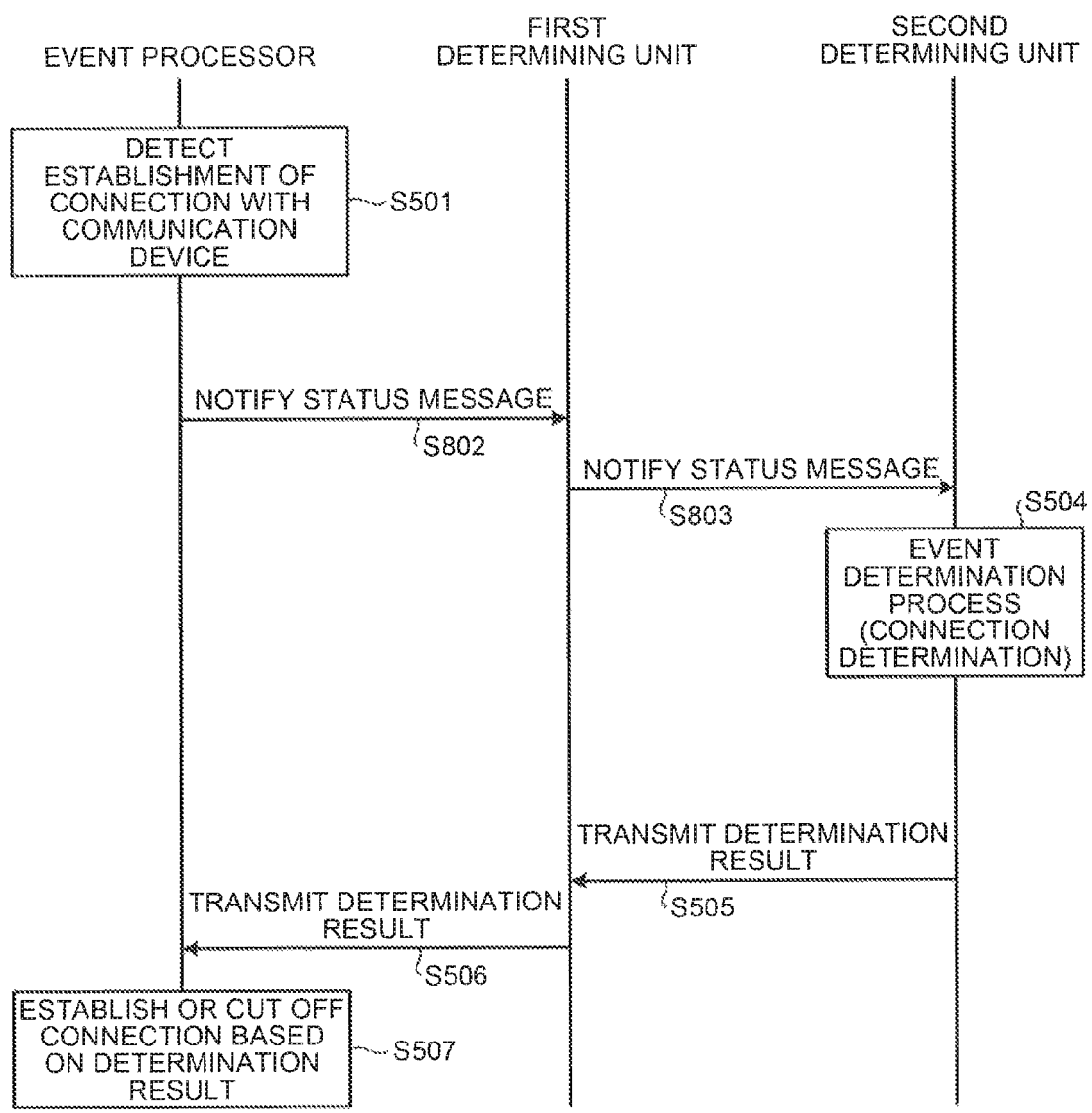
FIG. 14 is a sequence diagram illustrating a flow of processing for determining whether to permit or prohibit execution of an event according to the fourth embodiment.

Furthermore, FIG. 14 is a sequence diagram illustrating a flow of event processing for connection establishment in a case where the Bluetooth connection process is performed at a server. Processes that are the same as those in FIG. 13 are designated by the same reference numerals and only difference therefrom will be described. First, the connection establishing unit of the event processor 10 detects a Bluetooth connection establishment request from the communication device 23 (step S501). At this point, the Bluetooth connection with the communication device 23 is not yet completed. The communication unit 13 notifies the first determining unit 100 of a status message indicating that the Bluetooth connection establishment request is received from the communication device 23 (step S802). Subsequently, since the content of the event is to be processed by the second determining unit 200, the first determining unit 100 notifies the second determining unit 200 of a status message indicating that the status is that the acquired Bluetooth connection establishment request is received from the communication device 23 (step S803). Specifically, since the address of the device to be connected cannot be acquired in this case, only the message indicating that a connection is received is notified.

Figure 15:
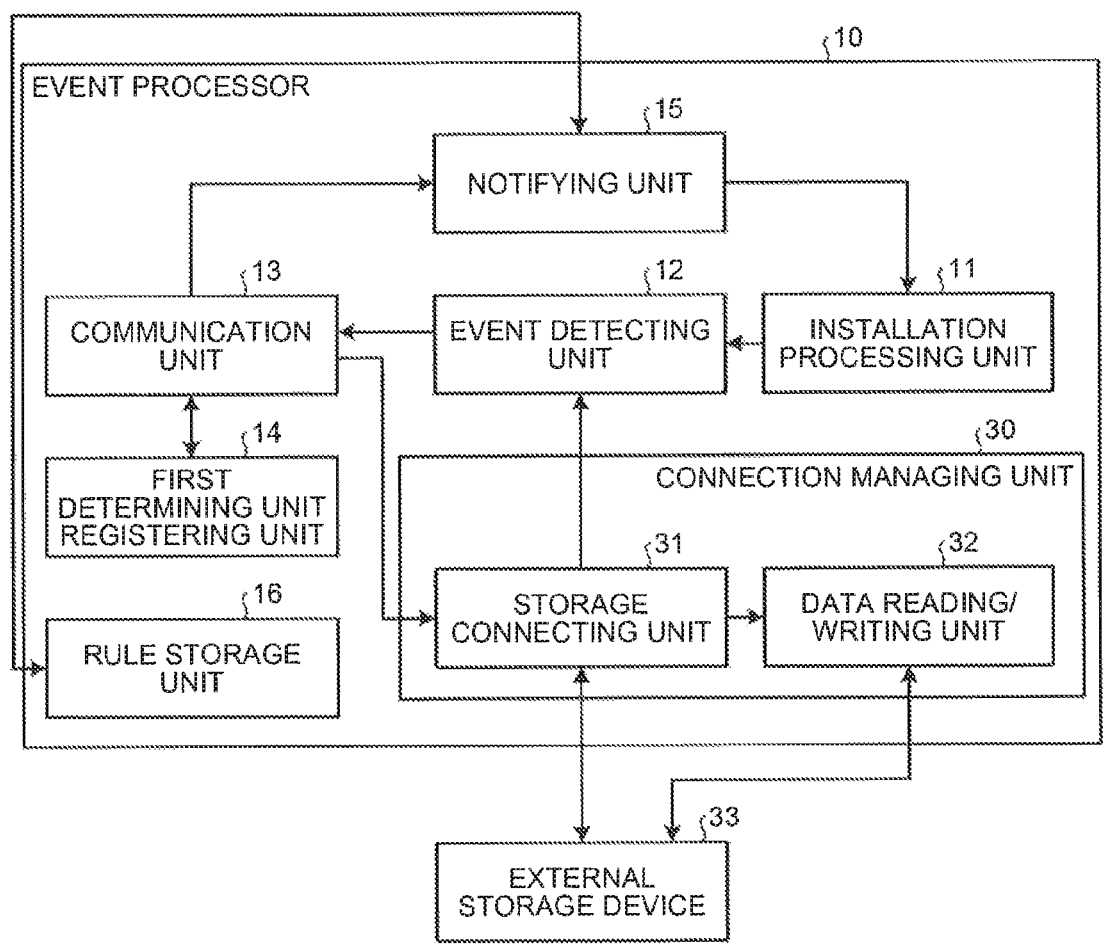
FIG. 15 is a block diagram illustrating a functional configuration of an event processor according to the fourth embodiment.

Furthermore, FIG. 15 illustrates a case in which the device to be connected is a storage device such as a USB memory, a hard disk drive (HDD), or an SD card. As illustrated in FIG. 15, the connection managing unit 30 includes a storage connecting unit 31 and a data reading/writing unit 32. A flow of processing in the case where the device to be connected is a storage device will be described below with reference to FIG. 16.

Figure 16:
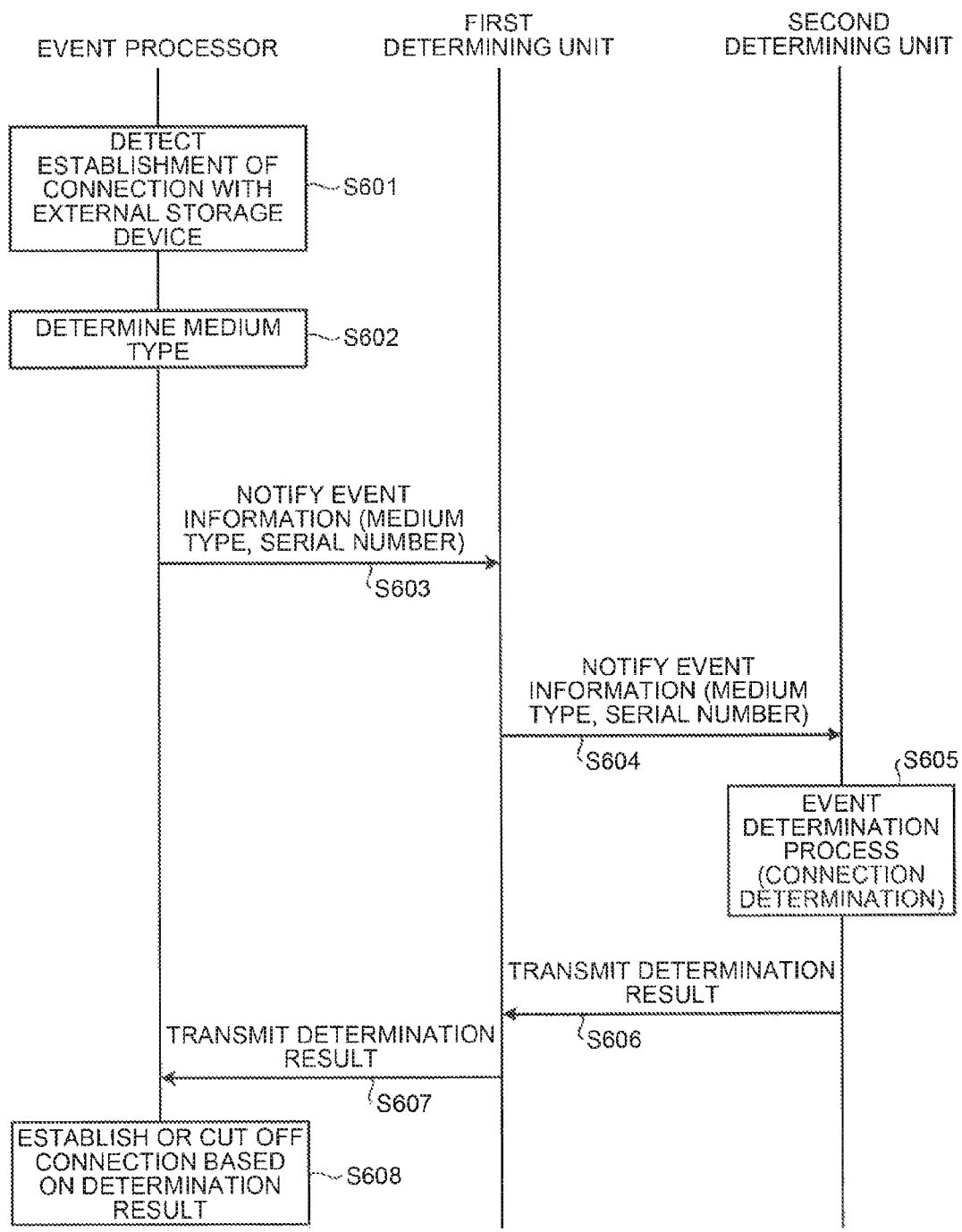
FIG. 16 is a sequence diagram illustrating a flow of processing for determining whether to permit or prohibit execution of an event according to the fourth embodiment.

As illustrated in FIG. 16, the storage connecting unit 31 of the event processor 10 first detects connection establishment with an external storage device 33 (storage device) (step S601). Subsequently, the storage connecting unit 31 determines the medium type, such as a USB memory or an SD card, of the storage with which connection is established (step S602). Subsequently, the communication unit 13 notifies the first determining unit 100 of the event, specifying the acquired medium type, and a serial number and the like if the medium type is a USB memory (step S603). Since the content of the event is to be processed by the second determining unit 200, the first determining unit 100 notifies the second determining unit 200 of the event information specifying the acquired medium type, and the serial number and the like if the medium type is a USB memory (step S604).

The second determining unit 200 performs an event determining process on the basis of the received information to determine whether or not to permit the connection (step S605). The second determining unit 200 transmits the determination result to the first determining unit 100 (step S606), and the first determining unit 100 transfers the received determination result to the event processor 10 (step S607). The event processor 10 then performs a process of either establishing or cutting off the connection on the basis of the received determination result (step S608).

As described above, according to the present embodiment, it is possible to determine whether to permit or prohibit an event by cooperation of applications even for an event of connection with another device such as a communication device or a storage device.

Fifth Embodiment

Figure 17:
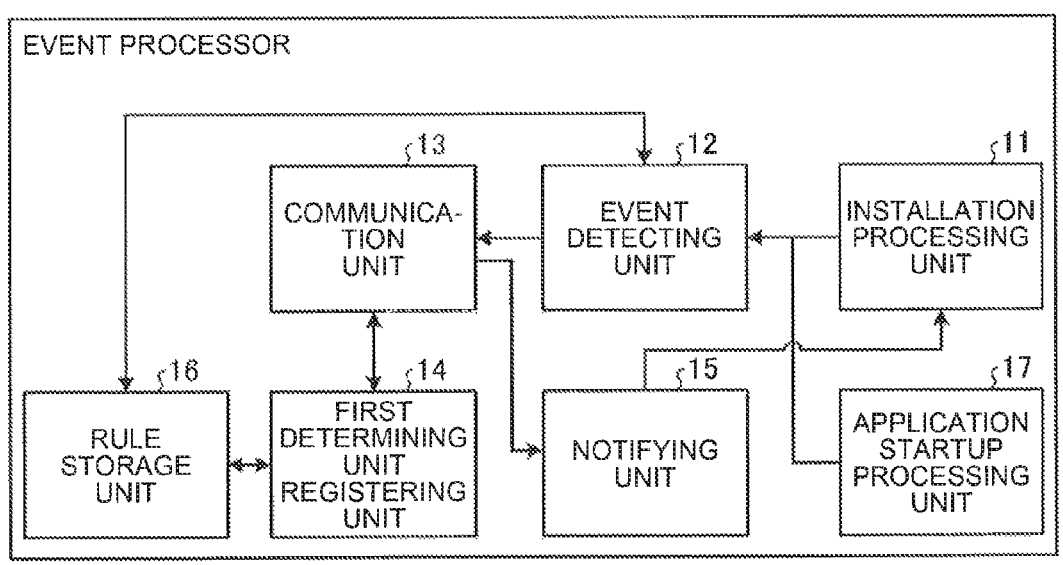
FIG. 17 is a block diagram illustrating a functional configuration of an event processor according to a fifth embodiment.

A fifth Embodiment representing a case where an event to be limited is application startup will be described with reference to FIGS. 17 and 18. As illustrated in FIG. 17, the event processor 10 includes an application launch processing unit 17 in addition to the configuration illustrated in FIG. 1. The application launch processing unit 17 is a processing unit that performs a launching process when an application executing unit 1000 (see FIG. 1) starts applications including the first determining unit 100, the second determining unit 200, and the general application unit 900. The application executing unit 1000 is a platform for executing various application programs and can be implemented by a virtual machine such as a JAVA (registered trademark) virtual machine. Specifically, the application executing unit 1000 performs processes such as acquisition of executable codes and various resource files necessary for execution of applications from the application storage unit 400, and memory allocation.

Figure 18:
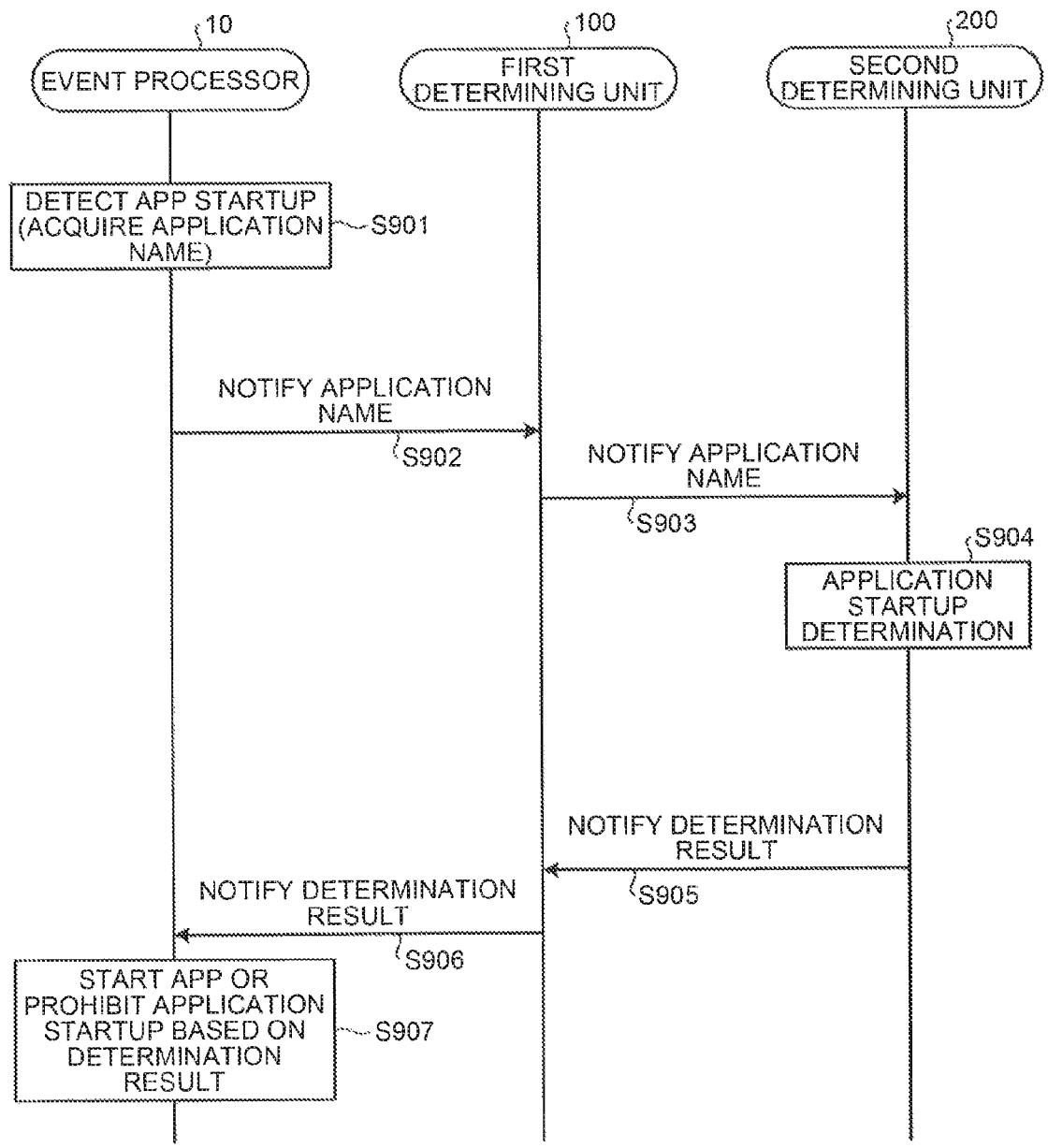
FIG. 18 is a sequence diagram illustrating a flow of processing for determining whether to permit or prohibit execution of an event according to the fifth embodiment.

FIG. 18 is a sequence diagram illustrating a flow of event processing for application startup. As illustrated in FIG. 18, the application launch processing unit 17 of the event processor 10 first detects an application launch event, and acquires the application name thereof (step S901). At this point, the application launch process is not yet completed. The communication unit 13 notifies the first determining unit 100 of the application name and that the event is an application launch event (step S902). Since the content of the event is to be processed by the second determining unit 200, the first determining unit 100 notifies the second determining unit 200 of the acquired application name and information indicating that the event is an application launch event (step S903).

The second determining unit 200 performs an event determining process on the basis of the received information to determine whether or not the application is an application permitted to be launched (step S904). The second determining unit 200 transmits the determination result to the first determining unit 100 (step S905), and the first determining unit 100 transfers the received determination result to the event processor 10 (step S906). The event processor 10 then performs a process of either launching the application or prohibiting launch of the application on the basis of the received determination result (step S907).

Note that it is determined at the second determining unit 200 whether or not to permit launch of an application according to the identification information (application name) thereof. This configuration can be modified as follows. The configuration may be such that, similarly to the first determining unit 100, the second determining unit 200 is also provided with a signature managing unit, a signature verifying unit, and an application acquiring unit, the signature verifying unit verifies whether or not a public key contained in an application package of an application to be started and a public key acquired via the signature managing unit match with each other, and the launch is permitted only when the verification is successful.

While the cases in which the second determining unit is installed are presented in the embodiments described above, if the second determining unit is not installed, the first determining unit may be configured to be able to determine whether or not to permit or prohibit execution of installation.

Furthermore, while prevention of masquerade by using the technology of electronic signature is performed using a signature signed by a secret key generated by the manufacturer of the second determining unit for verification of an application in the description above, verification of a signature may be performed in a manner that the manufacturer of the first determining unit delivers a secret key to the manufacturer of an application permitted to cooperate with and verifies the signature according to whether or not the secret key can be decrypted with the public key thereof. Alternatively, other existing technologies for detecting masquerade and alternation may be used.

Note that a kernel unit and functions of a management application in the information processing device of the embodiments described above may be provided as programs. In this case, the programs are recorded on a computer readable recording medium such as a CD-ROM, a flexible disk (FD), a CD-R, and a digital versatile disk (DVD) in a form of a file that can be installed or executed, and provided as a computer program product.

Alternatively, the programs may be stored on a computer system connected to a network such as the Internet, and provided by being downloaded via the network. Still alternatively, the programs may be provided or distributed through a network such as the Internet.

Still alternatively, the programs may be embedded in a ROM or the like in advance and provided as a computer program product.

If, however, a generating unit and a transfer instructing unit are provided as programs, the programs are read out from a storage medium and executed by an electronic circuit or a processor different from the CPU (processor), whereby the units are loaded onto a main storage unit and the generating unit and the transfer instructing unit are generated thereon in an actual hardware configuration.

Situations in which the invention according to the embodiments described above is utilized will be described below. In recent years, for example, with the increase of information devices such as tablets and smart phones used in mobile applications, software in such devices has changed from that provided from a single supplier and preinstalled as in the past to applications that can be additionally installed and customized freely by users. Control on whether or not to permit an event such as a system call that has occurred used to be integrated into a part called kernel in the past, but as operation development environment for third parties such as ANDROID (registered trademark) is improved, configurations for event processing are increasingly developed and distributed by different independent organizations for different functions.

In particular, when mobile devices such as tablets and smart phones are to be used for business applications, it is required to limit the functions of the devices according to policies of respective companies. Required conditions vary depending on the security policies of respective companies; for example, it is required to prohibit connection of external storage devices such as external USB memories and SD cards with the devices for a certain company in order to prevent leakage of information stored in the tablets, connection with external storage devices is permitted but it is required to prohibit connection with BLUETOOTH (registered trademark) devices for another company. In the field of PCs in recent years, administrator privilege and general user privilege are separated by passwords and a general user of a device is given only user privileges by setting a password for general user privileges. In addition, it is common that a security administrator installs special software for managing a device and sets the special software to prohibit connection of external storage devices and/or to prohibit connection of Bluetooth devices so as not to allow a general user to invalidate the settings.

Systems employed in mobile devices such as Androids, however, do not have mechanisms for separating privileges by passwords owing to the background that such systems have originally been developed for personal use. Accordingly, even if a security administrator installs special software for managing a device and makes various settings for the device, a general user can invalidate the settings. Furthermore, as described above, if it is attempted to develop and distribute special software (device management applications) for managing a device by different organizations, there are risks that the protocols for data communication between the application and the operating system of a device where an event occurs and between the applications are analyzed and that an unauthorized device management application responds to the device where the event has occurred with a wrongly-altered determination result as to whether or not to permit or prohibit execution of the event that has occurred, which leads to alteration of behavior into behavior different from that intended by the security administrator. The embodiments described above address such risks and can improve the security in cases where processes are shared among a plurality of modules.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
an event processor; and
a first determining circuitry, wherein
the event processor
detects an event and suspends execution of the event, the event including an installation of application;
stores first identification information of a first application corresponding to the first determining circuitry that is configured to perform a determination process of determining whether to permit or prohibit the detected event;
determines whether the first identification information stored in a rule storage and identification information of the first determining circuitry match with each other when a registration request to transmit an inquiry as to whether to permit or prohibit execution of the event is received from the first determining circuitry;
registers the first determining circuitry when the first identification information and the identification information match with each other; and
transmits the detected event to the registered first determining circuitry,
the first determining circuitry
transmits the registration request to the event processor at launch of the first determining circuitry;
contains second identification information and a public key, the second identification information and the public key being used for verification as to whether a signature for a second application is valid, the second application being different from the first application and configured to perform the determination process;
receives a registration request from the second application;
verifies the signature of the second application with the second identification information and the public key;
registers the second application when the verification of the signature is successful;
receives a request for the determination process from the event processor;
transmits a result of the determination process to the event processor;
transfers the received event to the second application registered in the first determining circuitry; and
receives the result of the determination process from the second application, and
the event processor cancels suspending of the event and executes the event when the received result of determination indicates permission of the execution,
wherein the first determining circuitry further determines that the determination as to whether to permit or prohibit execution of the detected event is to be made by the first determining circuitry when the detected event is at least the installation of the second application.

2. The device according to claim 1, wherein
the first determining circuitry stores therein first rule information that defines an event or events for which the request for the determination process is to be transmitted to the second application, and
when the second application is registered, the first determining circuitry updates the first rule information in response to an instruction on the event to be processed from the second application.

3. The device according to claim 2, wherein
the event processor stores second rule information that defines an event or events for which the request for the determination process is to be transmitted to the first determining circuitry,
when the second application is registered, the first determining circuitry transmits third rule information that results from updating the first rule information to the event processor, and
the event processor updates the second rule information with the received third rule information.

4. The device according to claim 1, wherein the event is any one of uninstallation of an application, connection with an external storage, connection of a Bluetooth device, connection of a Wi-Fi device, and startup of an application.

5. The device according to claim 1, wherein
the first determining circuitry determines whether a determination as to whether to permit or prohibit execution of the detected event is to be made by the first application or by the second application.

6. An information processing device comprising:
an event processor;
a first determining circuitry; and
a second determining circuitry, wherein
the event processor
detects an event and suspends execution of the event, the event including an installation of application;
stores first identification information of a first application corresponding to the first determining circuitry that is configured to perform a determination process of determining whether to permit or prohibit the detected event;
determines whether the first identification information and identification information of the first determining circuitry match with each other when a registration request to transmit an inquiry as to whether to permit or prohibit execution of the event is received from the first determining circuitry;
registers the first determining circuitry when the first identification information and the identification information match with each other; and
transmits the detected event to the registered first determining circuitry,
the first determining circuitry
transmits the registration request to the even processor at launch of the first determining circuitry;
contains second identification information and a public key, the second identification information and the public key being used for verification as to whether a signature for a second application corresponding to a second determining circuitry is valid, the second determining circuitry being different from the first determining circuitry and configured to perform the determination process;
receives a registration request from the second application;
verifies the signature of the second application with the second identification information and the public key;
registers the second application as the second determining circuitry when the verification of the signature is successful;
receives a request for the determination process from the event processor;
transmits a result of the determination process to the event processor;

transfers the received event to the second determining circuitry registered in the first determining circuitry; and receives the result of the determination process from the second determining circuitry, the second determining circuitry determines whether to permit or prohibit execution of the event received from the first determining circuitry; and returns a result of the determination as to whether to permit or prohibit execution of the event to the first determining circuitry, and the event processor cancels suspending of the event and executes the event when the received result of determination indicates permission of the execution, wherein the first determining circuitry further determines that the determination as to whether to permit or prohibit execution of the detected event is to be made by the first determining circuitry when the detected event is at least the installation of the second application.

7. The device according to claim 6, wherein the second determining circuitry determines whether to permit or prohibit execution of the event based on an event determination rule stored in an event determination server connected via a network.

8. A computer program product comprising a non-transitory computer-readable medium containing a program executed by a computer that includes an event processor and a first determining circuitry, the program causing the computer to execute:

detecting an event, the event including an installation of application;

suspending execution of the event;

storing first identification information of a first application corresponding to the first determining circuitry that is configured to perform a determination process of determining whether to permit or prohibit the detected event;

determining whether the stored first identification information and identification information of the first determining circuitry match with each other when a registration request to transmit an inquiry as to whether to permit or prohibit execution of the event is received from the first determining circuitry;

registering the first determining circuitry when the first identification information and the identification information match with each other;

transmitting the detected event to the registered first determining circuitry;

transmitting the registration request to the event processor at launch of the first determining circuitry;

receiving a registration request from a second application corresponding to a second determining circuitry that is different from the first determining circuitry and configured to perform the determination process;

verifying a signature of the second application with second identification information and a public key;

registering the second application as the second determining circuitry when the verification of the signature is successful;

receiving a request for the determination process from the event processor;

transmitting a result of the determination process to the event processor;

transferring the received event to the registered second determining circuitry;

receiving the result of the determination process from the second determining circuitry; and cancelling suspending of the event and executing the event when the received result of determination indicates permission of the execution, wherein the first determining circuitry further determines that the determination as to whether to permit or prohibit execution of the detected event is to be made by the first determining circuitry when the detected event is at least the installation of the second application.

9. An information processing method for an information processing device that includes an event processor and a first determining circuitry, the method comprising:

detecting an event;

suspending execution of the event;

storing first identification information of a first application corresponding to the first determining circuitry that is configured to perform a determination process of determining whether to permit or prohibit the detected event;

determining whether the stored first identification information and identification information of the first determining circuitry match with each other when a registration request to transmit an inquiry as to whether to permit or prohibit execution of the event is received from the first determining circuitry;

registering the first determining circuitry when the first identification information and the identification information match with each other;

transmitting the detected event to the registered first determining circuitry;

transmitting the registration request to the event processor at launch of the first determining circuitry;

receiving a registration request from a second application corresponding to a second determining circuitry that is different from the first determining circuitry and configured to perform the determination process;

verifying a signature of the second application with second identification information and a public key;

registering the second application as the second determining circuitry when the verification of the signature is successful;

receiving a request for the determination process from the event processor;

transmitting a result of the determination process to the event processor;

transferring the received event to the registered second determining circuitry;

receiving the result of the determination process from the second determining circuitry; and cancelling suspending of the event and executing the event when the received result of determination indicates permission of the execution, wherein the first determining circuitry further determines that the determination as to whether to permit or prohibit execution of the detected event is to be made by the first determining circuitry when the detected event is at least the installation of the second application.

* * * * *